US006991421B2

(12) United States Patent
Namba et al.

(10) Patent No.: US 6,991,421 B2
(45) Date of Patent: Jan. 31, 2006

(54) SHEET ACCUMULATION PROCESSING DEVICE

(75) Inventors: Toyoaki Namba, Higashiosaka (JP); Kyosuke Taka, Nara (JP); Hideki Mimura, Yamanashi (JP); Yoshihisa Ogasawara, Kofu (JP)

(73) Assignees: Sharp Kabushiki Kaisha, (JP); Nisca Corporation, (JP)

( * ) Notice: Subject to any disclaimer, the term of this patent is extended or adjusted under 35 U.S.C. 154(b) by 236 days.

(21) Appl. No.: 10/691,741

(22) Filed: Oct. 22, 2003

(65) Prior Publication Data

US 2004/0085525 A1 May 6, 2004

Related U.S. Application Data

(63) Continuation of application No. 09/103,229, filed on Jun. 23, 1998, now abandoned.

(30) Foreign Application Priority Data

Jun. 23, 1997 (JP) .................................. 9-165937
Apr. 14, 1998 (JP) ................................ 10-102737

(51) Int. Cl.
*B65G 57/00* (2006.01)
*B65H 31/30* (2006.01)
*B65H 29/00* (2006.01)
*B65H 39/00* (2006.01)
*B65H 39/02* (2006.01)

(52) U.S. Cl. .............................. 414/789.9; 414/792.9; 414/790.2; 270/58.11; 270/52.25

(58) Field of Classification Search ............. 414/789.9, 414/790.2, 792.9; 270/52.25, 52.26, 52.27, 270/58.11; 271/220, 252
See application file for complete search history.

(56) References Cited

U.S. PATENT DOCUMENTS

| | | | | |
|---|---|---|---|---|
| 5,137,265 | A | 8/1992 | Sato et al. | |
| 5,169,133 | A | 12/1992 | Iwata et al. | |
| 5,478,062 | A * | 12/1995 | Horiuchi et al. | 271/220 |
| 5,639,029 | A * | 6/1997 | Sundholm | 239/488 |
| 5,653,573 | A | 8/1997 | Aoki et al. | |
| 5,765,824 | A | 6/1998 | Kawano et al. | |
| 5,997,239 | A | 12/1999 | Mimura et al. | |

* cited by examiner

*Primary Examiner*—Gene O. Crawford
(74) *Attorney, Agent, or Firm*—Perkins Coie LLP

(57) ABSTRACT

There is disclosed a sheet accumulation processing device having a shielding mechanism of a sheet discharge opening which is simple in mechanism, low in cost and requires no complicated control. In the device, after an end of a sheet bunch sent via one end of a slit opening formed in a housing front face of the device is received by a sheet holding means disposed in the slit opening in a predetermined receiving position, the sheet holding means with the sheet bunch held therein is moved along the opening and, in a predetermined discharge position in the slit opening, discharges the sheet bunch onto a sheet accumulating tray in front of the housing. In the discharge position, a sheet holding section of the holding means is rotated forward and downward from its sheet-bunch holding condition and protruded forward from the housing front face, then releases the sheet bunch to place the sheet bunch onto the sheet accumulating tray. The slit opening in the discharge position changes from a closed condition to an opened condition dependent on the rotating movement of the sheet holding section, and subsequently changes from the opened condition to the closed condition dependently when the sheet holding section is retreated into the slit opening. The sheet holding section can thus be protruded and retreated via the housing front face.

8 Claims, 28 Drawing Sheets

SHEET ACCUMULATION PROCESSING DEVICE

The Application is a continuation of and claims priority under 35 U.S.C. §120 to application Ser. No. 09/103,229, filed Jun. 23, 1998 now abandoned entitled SHEET ACCUMULATION PROCESSING DEVICE, which is hereby incorporated by reference in its entirety, and which claims priority under 35 U.S.C. § 119 to Japanese Patent Applications 9-165937, filed Jun. 23, 1997 and 10-102737, filed Apr. 14, 1998 both of which are incorporate by reference in their entirety for all purposes.

BACKGROUND OF THE INVENTION (i) Field of the Invention

The present invention relates to a sheet accumulation processing device for accumulating and discharging sheets or a sheet bunch continuously fed from a copying machine, a printer or another image forming device onto a predetermined accumulating tray, especially to a shielding device of an opening formed in a device surface for conveying sheets in a transverse direction and piling the sheets on an accumulating tray.

(ii) Description of the Related Art

In many cases, a rotating roller usually constituted of a drive roller and a free roller engaged with the drive roller to dependently rotate is used in a discharge mechanism for discharging sheets with images formed thereon from a sheet discharge port of an image forming device to a sheet discharge tray. The sheet discharge tray is inclined and attached to the image forming device below, and the sheets discharged one by one are accumulated on the tray while ends of the sheets are aligned with a positioning/matching vertical wall of the image forming device. Furthermore, in an image forming device in which plural sheet discharge trays are provided and sheets can be discharged to an optional sheet discharge tray, when the sheet discharge tray loaded with plural sheets vertically passes the sheet discharge port of the image forming device, the sheets are dropped or narrowed toward the sheet discharge port, thereby disadvantageously jamming the sheets and disturbing matched or superimposed conditions of the sheets, because the sheet discharge device is inclined as aforementioned. To prevent this and other problems, there is provided a shutter device having a drive mechanism for shielding the sheet discharge port at least while the sheet discharge port is vertically moved.

Recently, in a sheet accumulation processing device, instead of discharging the sheets with images formed thereon from the image forming device as they are to the sheet discharge tray as aforementioned, after superimposed end faces of the predetermined number of stacked or gathered sheets are matched, stapling, punching or another processing is performed. The processed sheet bunch can be transferred to an adjoining sheet accumulation processing device, and discharged to a predetermined sheet accumulating tray.

In order to provide a shielding means having a conventional drive mechanism, for example, a motor as a drive device, a drive force conducting belt, a shutter member operatively interconnected to the belt, a shutter position detector and a control device are required for constituting a shielding device. Therefore, costs of these constituting members and a space for arranging the constituting members in a device housing need to be secured. Additionally, the opening/closing of the shutter member needs to be controlled synchronously when a sheet holding means is protruded/retreated into or out of the housing at a high speed. Therefore, reliability would be deteriorated after a long use.

Additionally, even when an opening is provided with some shielding means like in the conventional art, whether intentionally or not, people hands or articles are inserted or entered via the opening into the device while the sheet holding means is inoperative or on standby. In this case, not only device troubles but also safety problems still remain unsolved.

SUMMARY OF THE INVENTION

Wherefore, an object of the invention is to provide a sheet accumulation processing device which is simple in mechanism, low in cost and requires no complicated control and to provide a safe and reliable shielding mechanism for a sheet discharge opening.

To attain this and other objects, the invention provides a sheet accumulation processing device provided with a sheet discharge opening shielding device having the following constitution:

An end of a sheet bunch is sent from an adjoining sheet post-processing device via a slit opening formed in a housing front face of the sheet accumulation processing device. The sheet accumulation processing device has a holding means for holding from above and below and receiving the fed sheet bunch. The holding means holds the sheet bunch in a predetermined receiving position in the slit opening before moving the sheet bunch along the opening while holding the sheet bunch. Furthermore, in a predetermined discharge position in the slit opening, the holding means protrudes the sheet bunch to a front of the housing and is protruded from a sheet bunch holding condition toward the front of a housing face. Subsequently, by releasing the sheet bunch, the sheet bunch is piled on the sheet accumulating tray. Here, the sheet discharge opening shielding device is changed from a closed condition to an opened condition accompanying the protruding operation of a sheet holding section. Subsequently, when the sheet holding section is retreated into the slit opening, the shielding device is dependently changed from the opened condition to the closed condition, so that the sheet holding section can be protruded and retreated via the housing front surface.

Moreover, the opening shielding device is constituted of a suspension plate suspended from a support of its upper end disposed in an upper portion of the slit opening and an elevating plate liftably disposed in a lower portion of the slit opening. The suspension plate and the elevating plate dependently open or close the opening shielding device when the sheet holding section is rotated or retreated as aforementioned.

The elevating plate is usually lifted up by one or plural elastic members toward the suspension plate, and pushed downward to opened accompanying the protruding operation of the sheet holding means. The protruding operation of the sheet holding means includes an operation that the sheet holding means is rotated and protruded forward and downward from the housing surface.

Additionally, another sheet accumulation processing device of the invention has a sheet holding means for receiving, holding and transferring a sheet conveyed from one side face of the device toward the other side face and protruding forward and placing the sheet onto an accumulating tray disposed in front of the device, and an opening formed in the device via which the sheet holding means transfers and piles the sheet as aforementioned. The opening is constituted of a horizontal opening formed in a front face of the device for passing the end of the sheet and a vertical opening adjacent to the horizontal opening for the piling operation of the holding means to the font of the device. The horizontal opening is constituted to close when the holding means is on standby and open when the holding means transfers and piles the sheet. A vertical opening means for opening/closing the vertical opening is further provided. The vertical opening means inhibits the vertical opening from opening at least when the holding means is on standby.

The vertical opening means is further constituted of an upper rotating shutter means and a lower elevating shutter means. The rotating shutter means is rotatably suspended from its upper end as a support, and the elevating shutter means is lowered to open when the holding means piles the sheets. The rotating shutter means is inhibited from rotating while the horizontal opening is closed, and allowed to rotate toward the front face of the device when the sheet holding means piles the sheets. The horizontal opening is opened when a panel member disposed on the device front face is raised, and closed when the panel member is lowered. The rotating shutter means is inhibited from rotating when the panel member is in a lowered position, and allowed to rotate when the panel member is raised. Furthermore, for safety, the rotating shutter means is locked to be prevented from rotating until the holding means moves to the vertical opening.

On the other hand, the elevating shutter means is lifted up or down by the movement of the sheet holding means. Specifically, when the sheet holding means moves from one side face of the device to the other side face and a portion of the sheet holding means operates a lever means disposed on a movement track, the elevating shutter means is raised, and when the sheet holding means returns to its original position, by resetting the operation of the lever means, the elevating shutter means is lowered.

DETAILED DESCRIPTION OF THE PREFERRED EMBODIMENTS

First, the whole of a sheet processing device will be described with reference to the accompanying drawings. The device is constituted of a sheet post-processing device for stapling or processing otherwise plural sheets discharged from an image forming device to a sheet processing tray (hereinafter referred to as the post-processing device) and an accumulation processing device for receiving a processed sheet bunch and discharging and accumulating the sheet bunch to a predetermined sheet discharge tray (hereinafter referred to as the accumulating tray). Embodiments of a shielding mechanism of the invention will also be described in detail.

Figure 1:
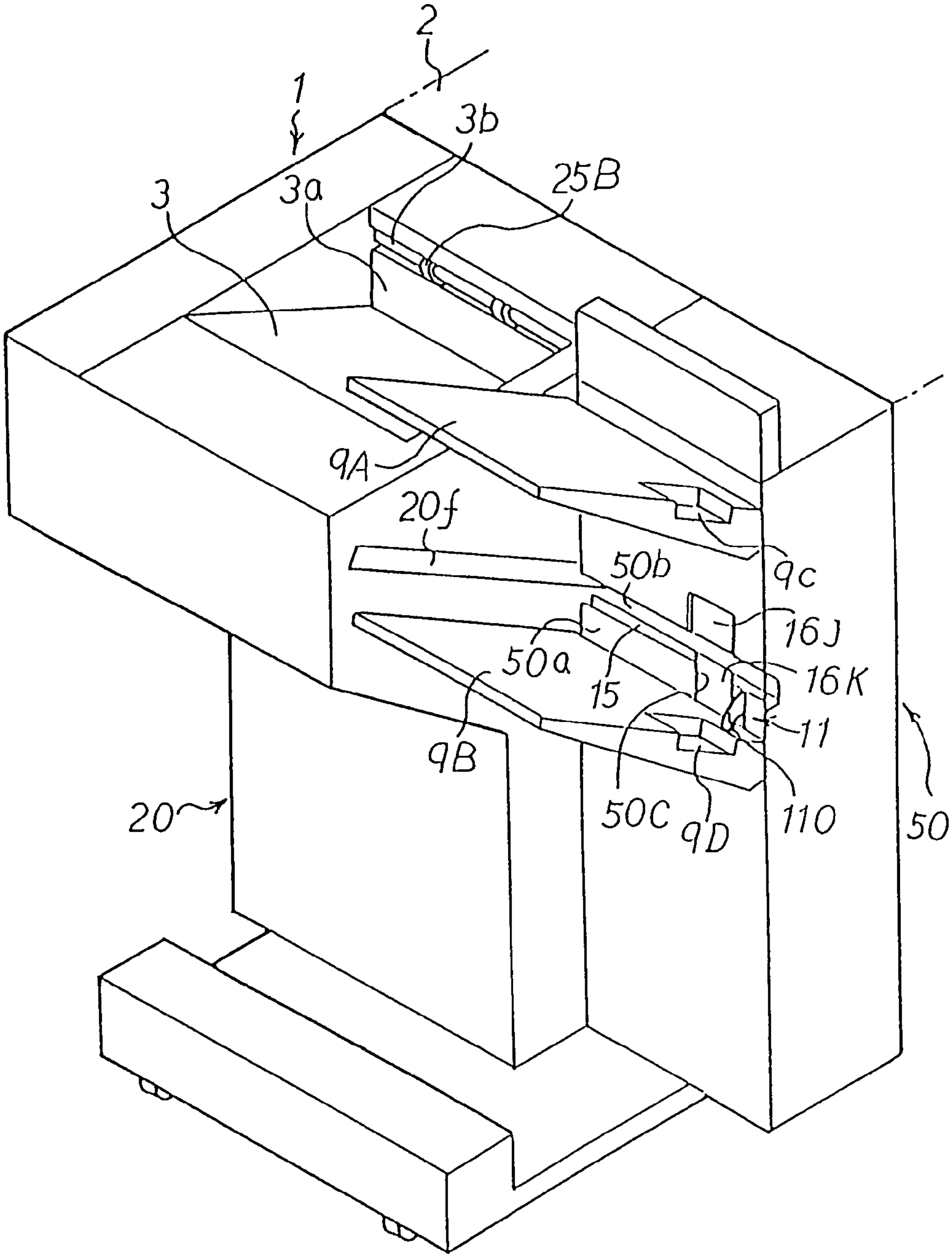
FIG. 1 is a perspective view showing a front appearance of a sheet processing device according to the invention.
Figure 2:
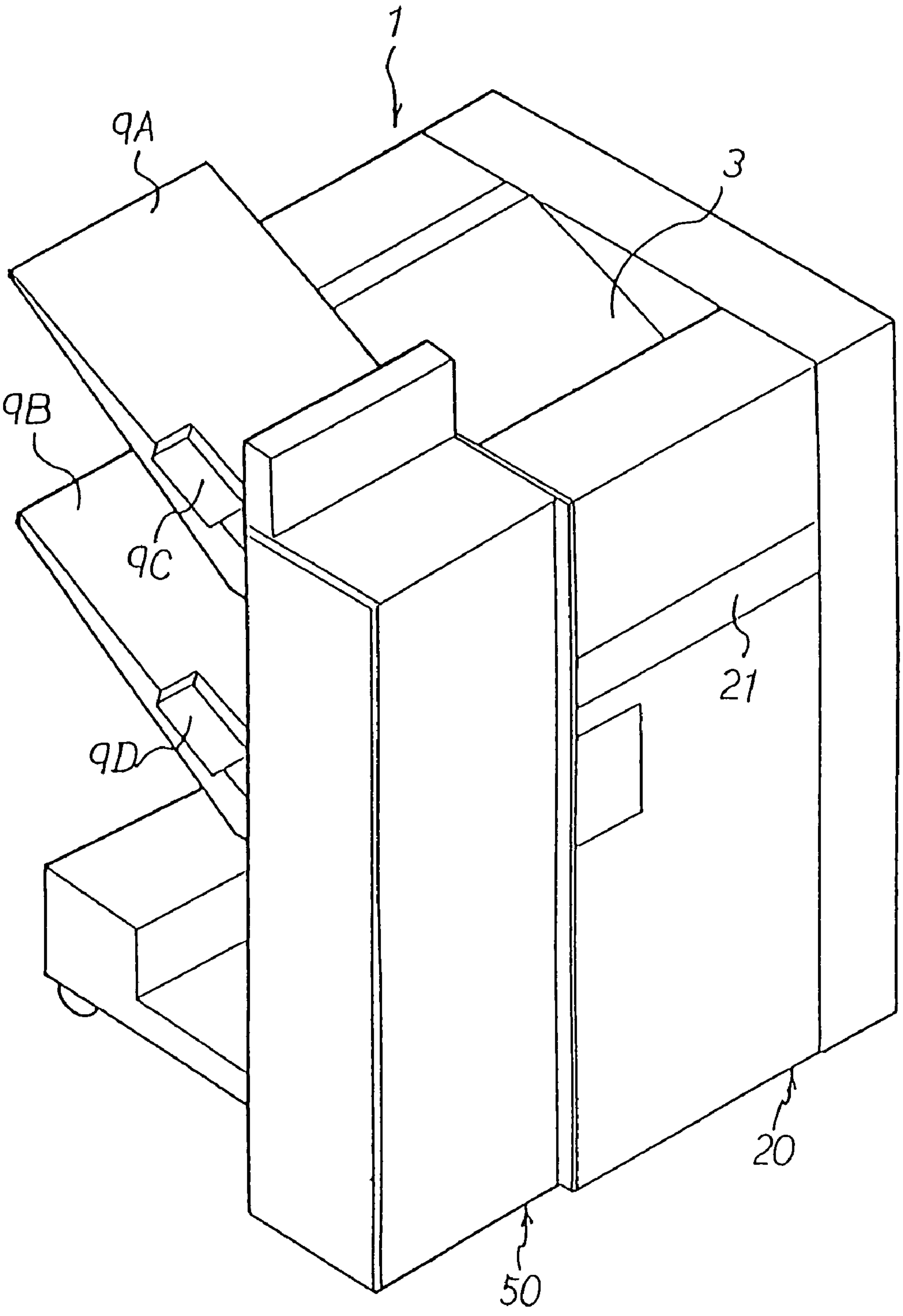
FIG. 2 is a perspective view showing a rear appearance of the sheet processing device.
Figure 3:
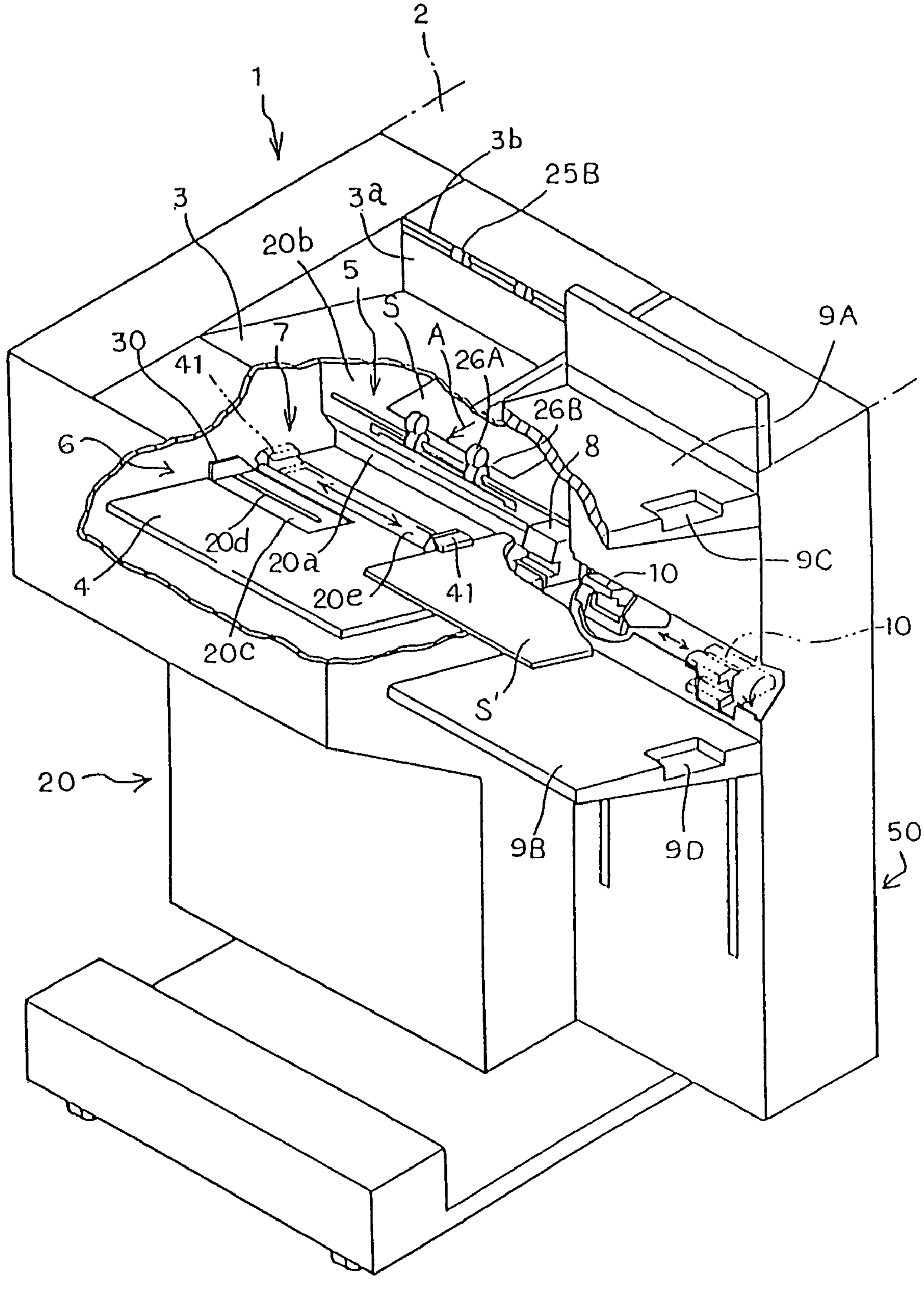
FIG. 3 is a partially broken perspective view showing the appearance of the sheet processing device.

In FIGS. 1 to 3, a sheet processing device 1 is provided with a post-processing device unit 20 and an accumulation processing device unit 50, each unit being constituted of an independent housing.

Figure 4:
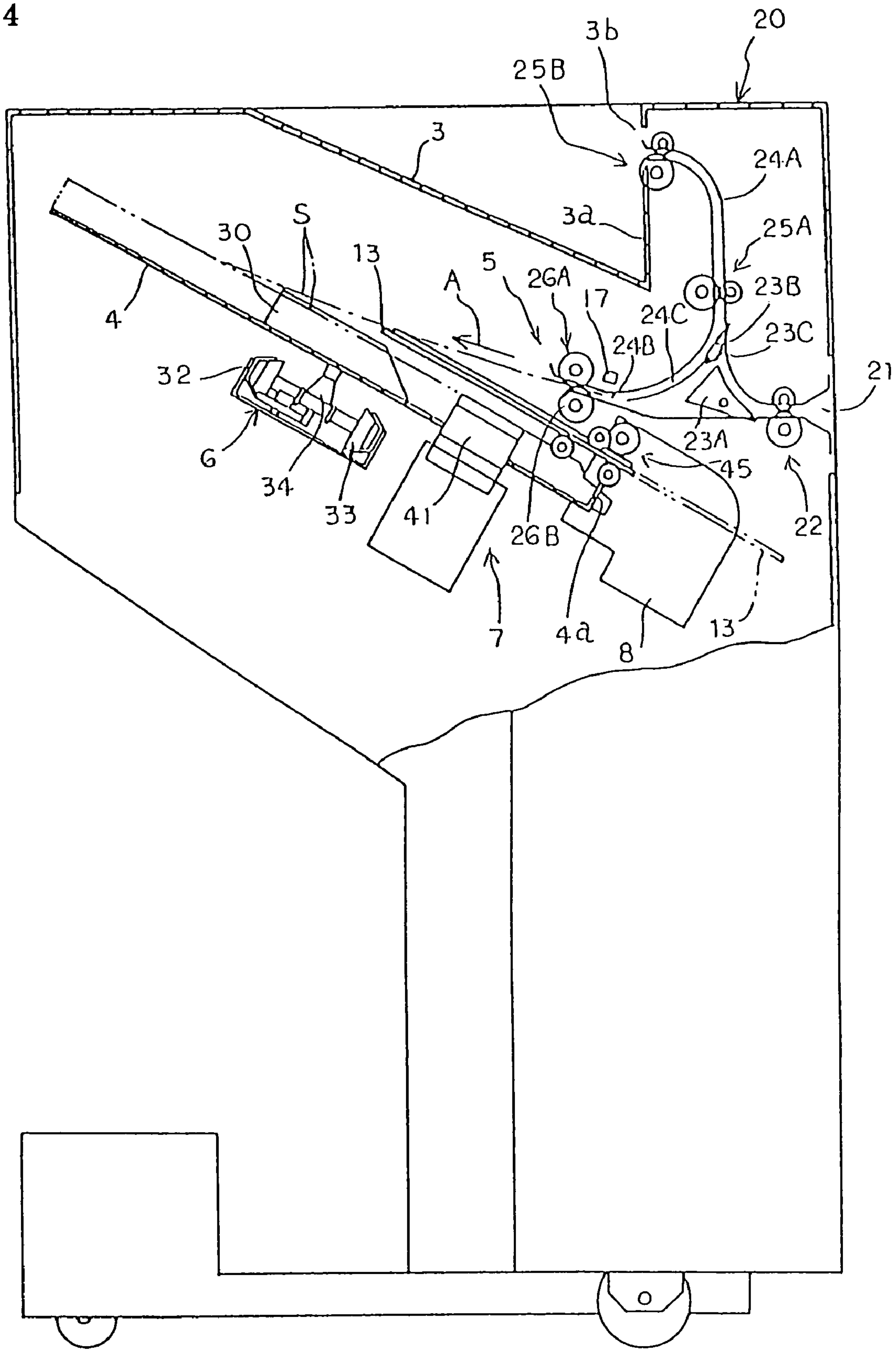
FIG. 4 is a partially broken side view of a post-processing device unit.

The post-processing device unit 20 is provided with, as shown in FIG. 3, a preparatory conveying means 5 for sorting sheets S with images formed thereon successively discharged from a copying machine 2 to an accumulating tray 3 if a post-processing is unnecessary and to a processing tray 4 if the post-processing is necessary; a matching means 6 for matching the plural sheets S received on the processing tray 4; a first holding means 7 for holding and conveying a matched sheet bunch S'; a stapler 8 for stapling the sheet bunch S' held by the first holding means 7; and, as shown in FIG. 4, an auxiliary tray 13 positioned above the processing tray 4 and below the preparatory conveying means 5.

Furthermore, as shown in FIG. 3, the post-processing device unit 20 is provided with a vertical wall 20a functioning as a storing reference surface of the sheets S relative to the processing tray 4; an opening 20*b* via which the sheets S are discharged; rail grooves 20*c* and 20*d* for allowing matching members 30 and holding members 34 described later to move; a rail groove 20*e* for allowing the first holding means 7 to move; and an opening 20*f* (FIG. 1) for allowing the sheet bunch S' held by the first holding means 7 and stapled to move from the processing tray 4 to two accumulating trays 9A and 9B.

Additionally, as shown in FIG. 1, the opening 20*f* is in parallel with the processing tray 4 and with the accumulating trays 9A and 9B. Therefore, the sheet bunch S' moves in parallel from the processing tray 4 to the accumulating trays 9A and 9B. Thereby, the alignment of the sheet bunch S' accumulated to the accumulating tray 9A or 9B is effectively maintained.

Figure 5:
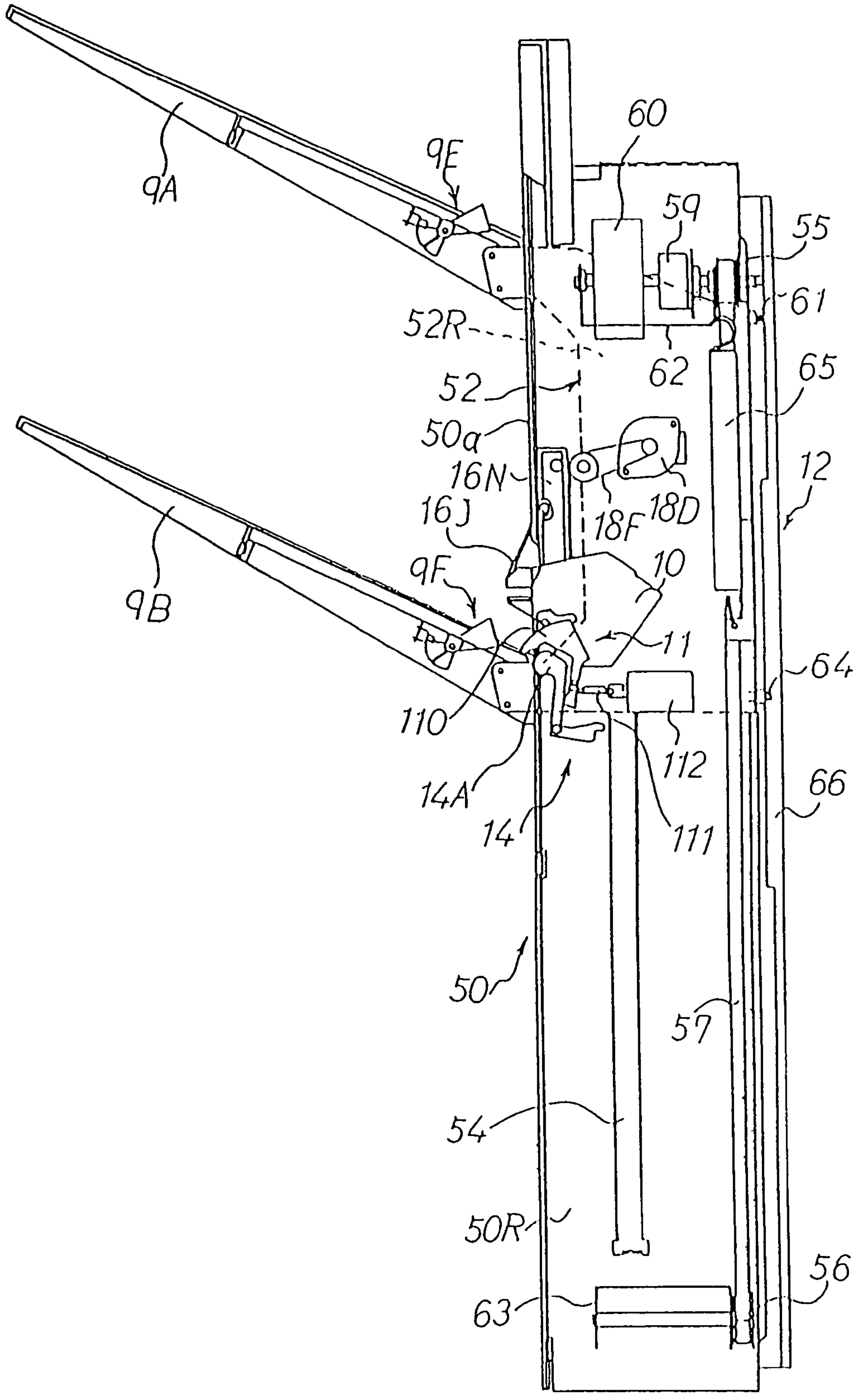
FIG. 5 is a side view showing an inner structure of an accumulation processing device unit.
Figure 6:
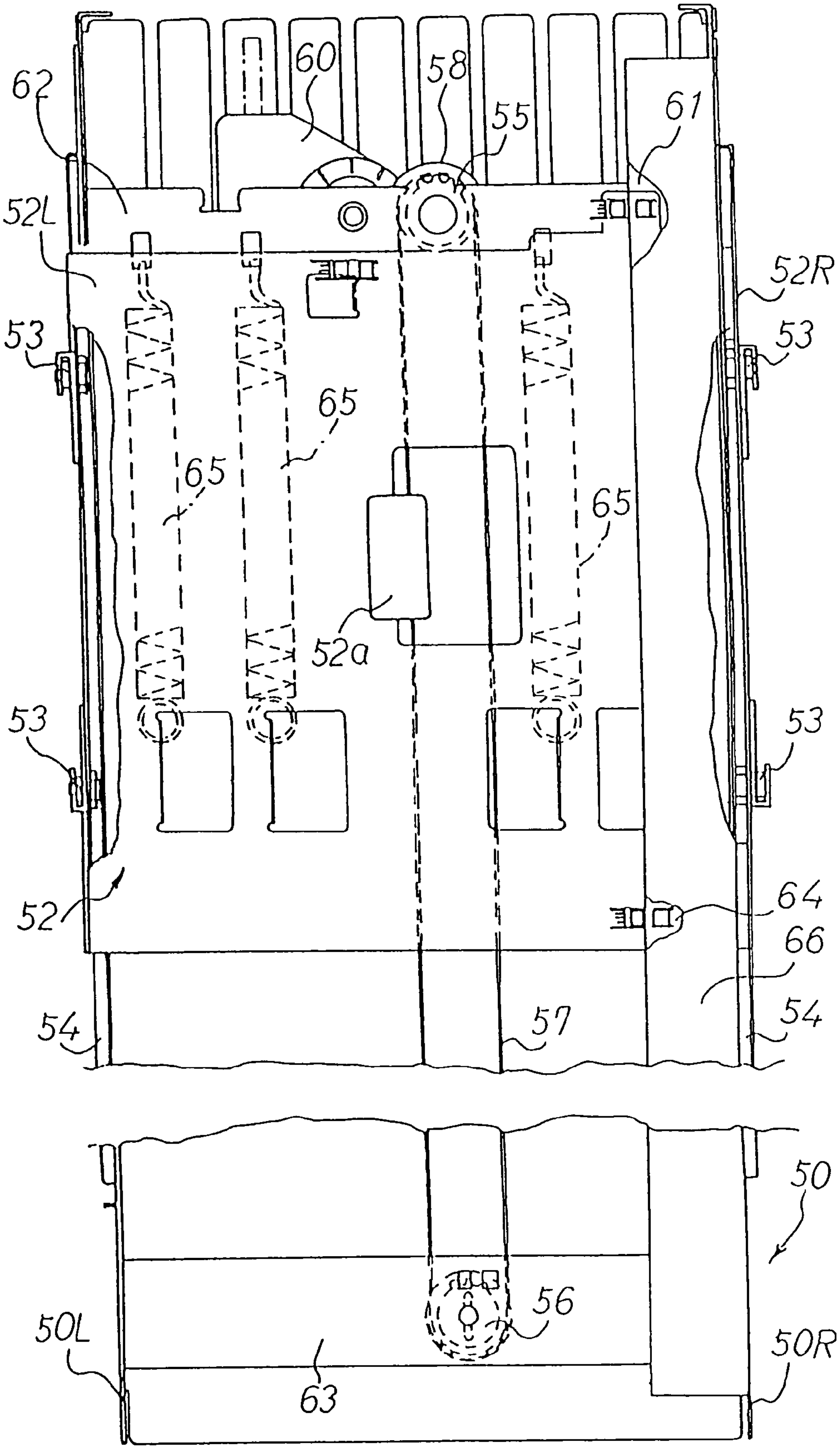
FIG. 6 is a front view showing an inner structure of the accumulation processing device unit.
Figure 7:
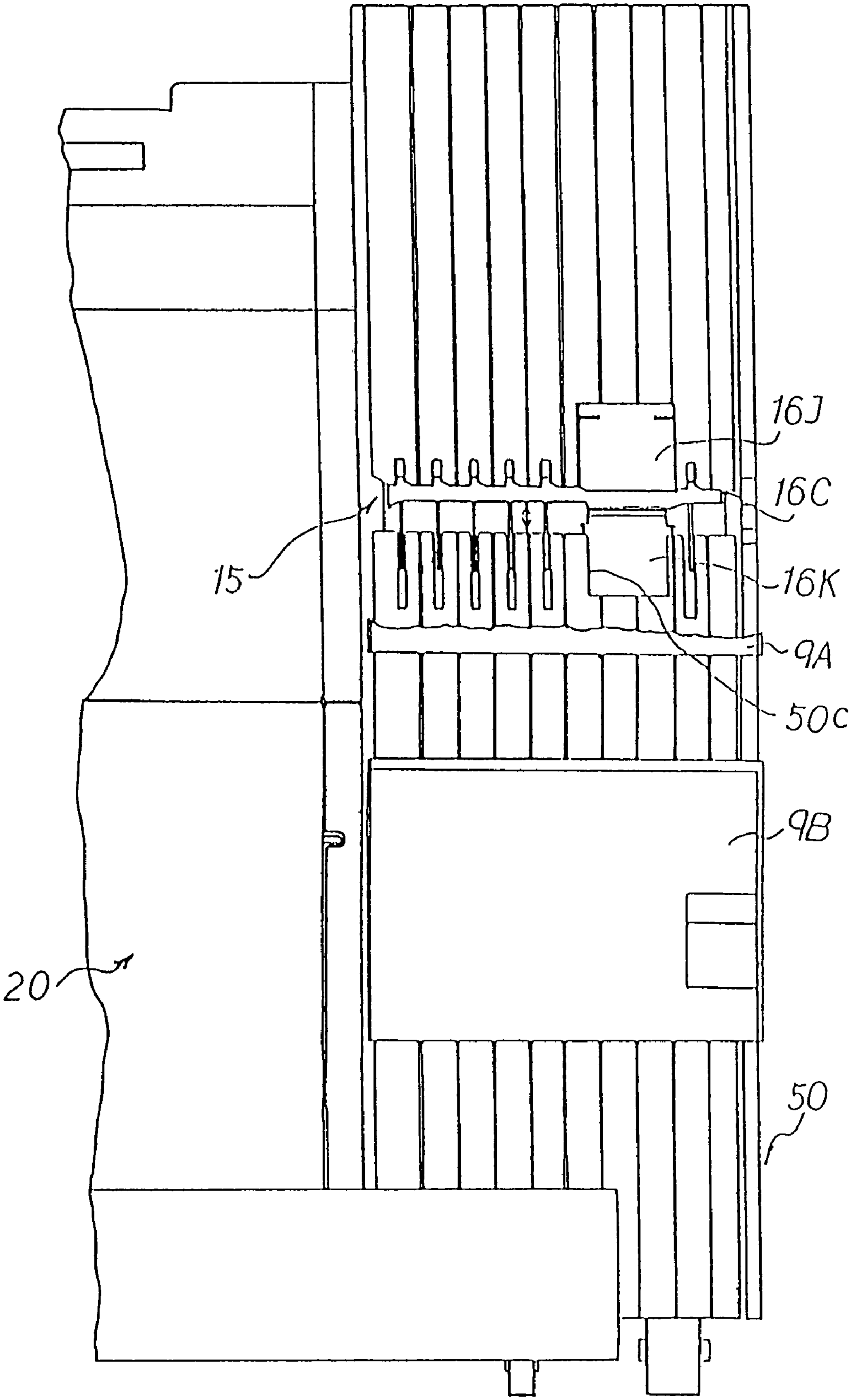
FIG. 7 is a front view showing an appearance of the accumulation processing device.
Figure 8:
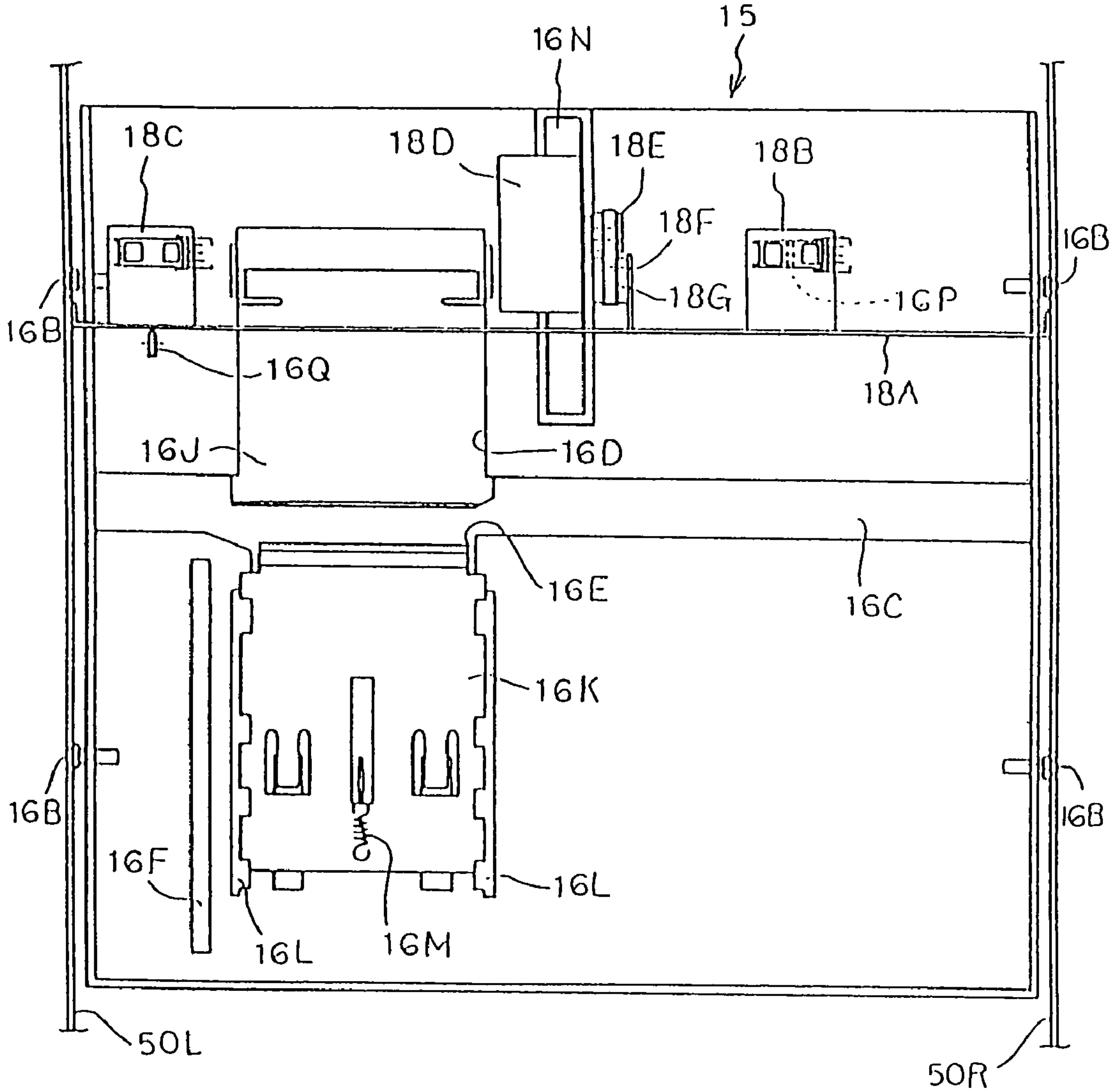
FIG. 8 is a rear view showing a structure of a shutter 15.
Figure 9:
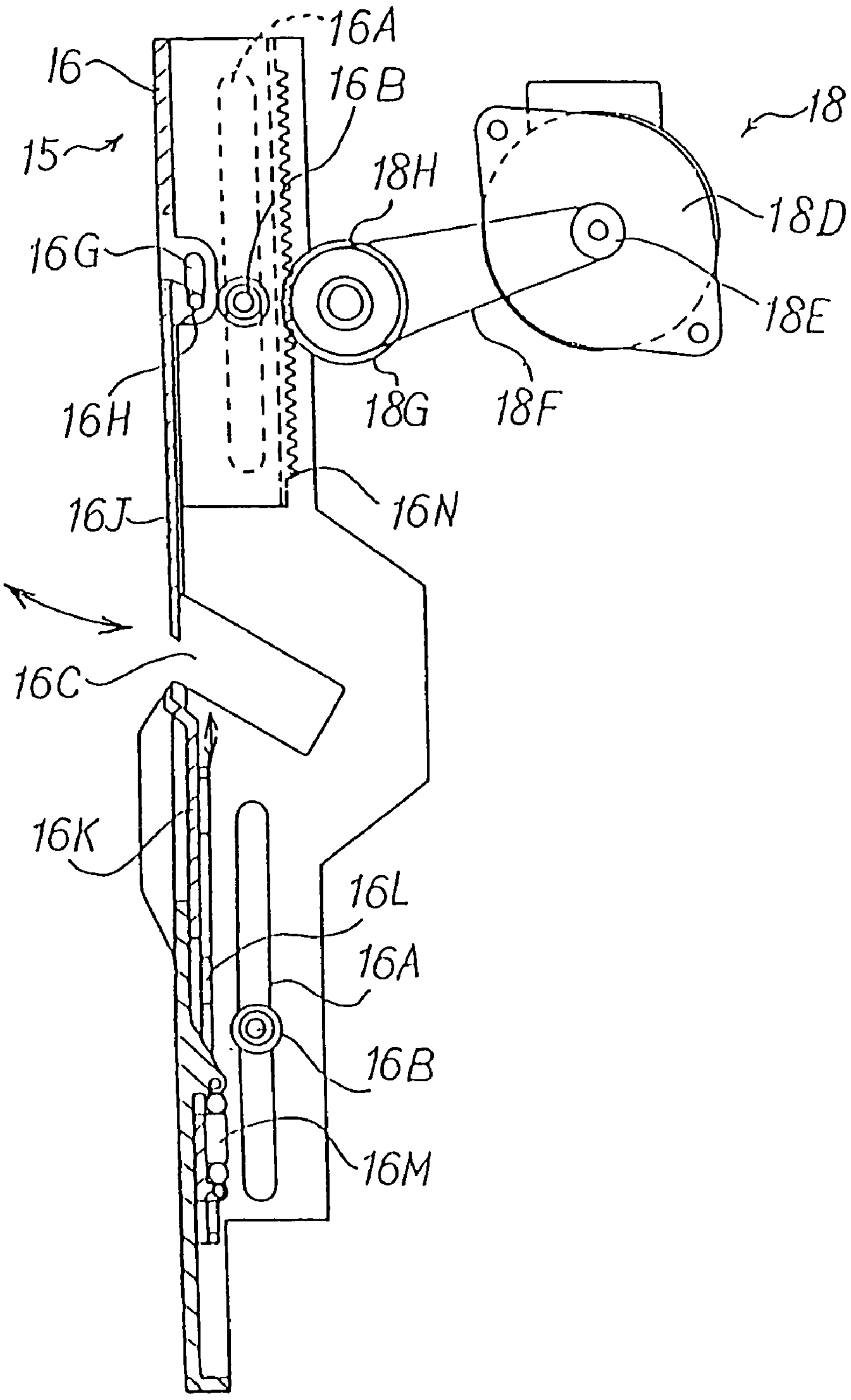
FIG. 9 is a side view showing a mechanism of the shutter 15.

The accumulation processing device unit 50 is provided with, as shown in FIG. 3, the accumulating trays 9A and 9B which can be raised/lowered to accumulate thereon the sheet bunch S' stapled by the stapler 8; a second holding means 10 for receiving and holding the sheet bunch S' held by the first holding means 7 and conveyed to the accumulating tray 9A or 9B and conveying the sheet bunch S' to a predetermined position on the accumulating tray 9A or 9B; as shown in FIGS. 5 and 6, a sheet height detecting means (sheet surface detecting sensor) 11 for detecting the height of the sheet bunch S' accumulated on the accumulating tray 9A or 9B; a halfway taking sensor 14 for detecting that an operator removes the whole or a part of the sheet bunch while the sheet bunch is being accumulated on the accumulating tray 9A or 9B; an elevating means 12 for raising/lowering the accumulating trays 9A and 9B; and, as shown in FIGS. 7 to 9, a shutter 15 for operating when the accumulating trays 9A and 9B are raised/lowered.

The accumulation processing device unit 50 is also, as shown in FIG. 1, provided with a positioning and matching vertical wall 50*a* onto which one side of the sheet bunch S' conveyed to the accumulating tray 9A or 9B abuts; a horizontal opening 50*b* for allowing the second holding means 10 to move in a horizontal direction; and a vertical opening 50*c* interconnected to the horizontal opening 50*b* for allowing the second holding means 10 to rotate in a vertical direction.

The accumulating tray 3 is, as shown in FIG. 3, formed by tilting an outer-frame upper portion of the postprocessing device unit 20, and has its upstream side positioned below and its downstream side positioned above. Furthermore, a vertical wall 3*a* is extended from an upstreamside end of the accumulating tray 3, and a releasing opening 3*b* is formed in an upper portion of the vertical wall 3*a*.

As shown in FIG. 4, in the preparatory conveying means 5, a conveying port 21 is formed in one or rear side face of the post-processing device unit 20, and aligned with a discharge port (not shown) of the copying machine 2. On the downstream side of the conveying port 12 a pair of conveying rollers 22 are arranged and a flapper 23A is then provided for switching a conveying path of the sheets S between a path 24A on the side of the upper accumulating tray 3 and a path 24B on the side of the lower processing tray 4. Moreover, the conveying path 24A is provided with pairs of conveying rollers 25A and 25B, while the conveying path 24B is provided with a pair of discharge rollers 26A and 26B and a sensor 17. Additionally, in order to reverse the sheets and discharge the reversed sheets to the processing tray 4, a reversing path 24C is interposed between the conveying paths 24A and 24B. When a rear end of the sheet passes along a reversing flapper 23B disposed in the conveying path 24A, the pairs of conveying rollers 25A and 25B rotate in reverse, a conveying direction of the sheet is reversed, and the sheet is supplied to the reversing path 24C. Additionally, a sensor 23C is attached to the reversing flapper 23B.

The processing tray 4 is positioned below the accumulating tray 3 and tilted in parallel with the accumulating tray 3. A series of sheets S is successively conveyed via the pair of conveying rollers 22 and the pair of discharge rollers 26A and 26B on a terminal end of the path 24B in a discharge direction A toward the processing tray 4, so that the sheets S are stapled by the stapler 8. As shown in FIG. 3, a tilted lower end portion of the processing tray 4 is raised or formed in a direction orthogonal to a tray surface, and an inner face of the raised portion forms the vertical wall 20*a* which abuts on one side of the sheet S extended back and forth in a direction orthogonal to the discharge direction A.

Figure 10:
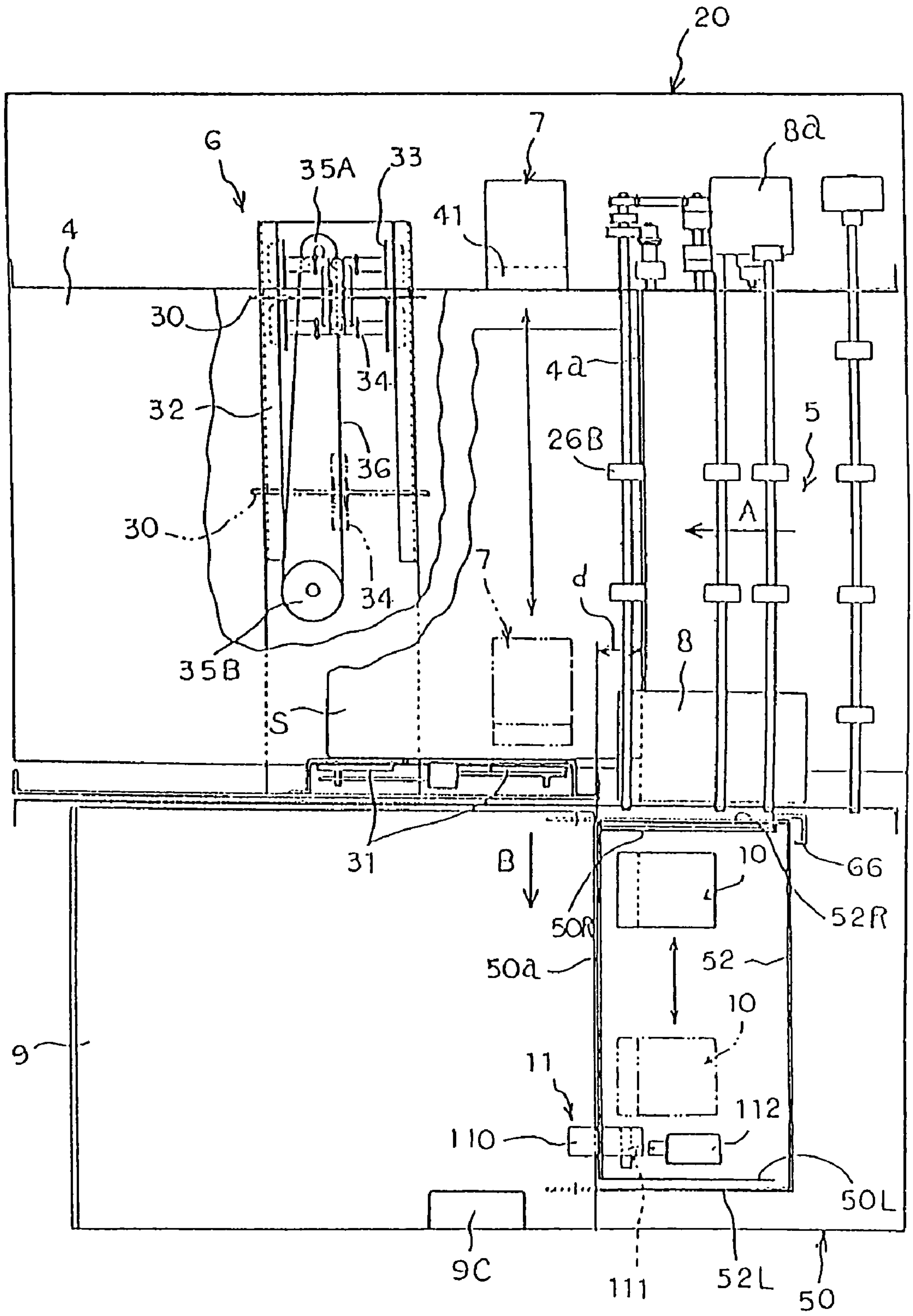
FIG. 10 is a sectional plan view of a sheet processing device.

In the matching means 6, in order to align the bunch S' of plural sheets stored on the processing tray 4, matching is performed before and after the discharge direction by bringing the sheets in contact with the reference surface 4a of the processing tray 4 as shown in FIG. 4. As shown in FIG. 10, on right and left sides of the discharge direction matching is performed by the matching members 30 arranged on opposite sides of the processing tray 4 and shutter type reference plates 31 which can be raised/lowered.

In a mechanism for moving the matching members 30, a rail 32 is extended in a transverse direction below the processing tray 4, holding members 34 are disposed for supporting the matching members 30 in such a manner that the matching members 30 can run inside the rail 32 via conical rollers 33, a belt 36 is extended between a pair of pulleys 35A and 35B, and the holding members 34 are partially fixed halfway to the belt 36. Additionally, one pulley 35B is operated by a matching motor 37 (refer to FIG. 17) to move the matching members 30.

While the sheets S are successively conveyed in the discharge direction A in this manner, the matching members 30 are in retreated and opened positions. After receiving the predetermined number of sheets S, the matching members 30 are advanced and pressed onto the reference plates 31 to perform matching.

Figure 16:
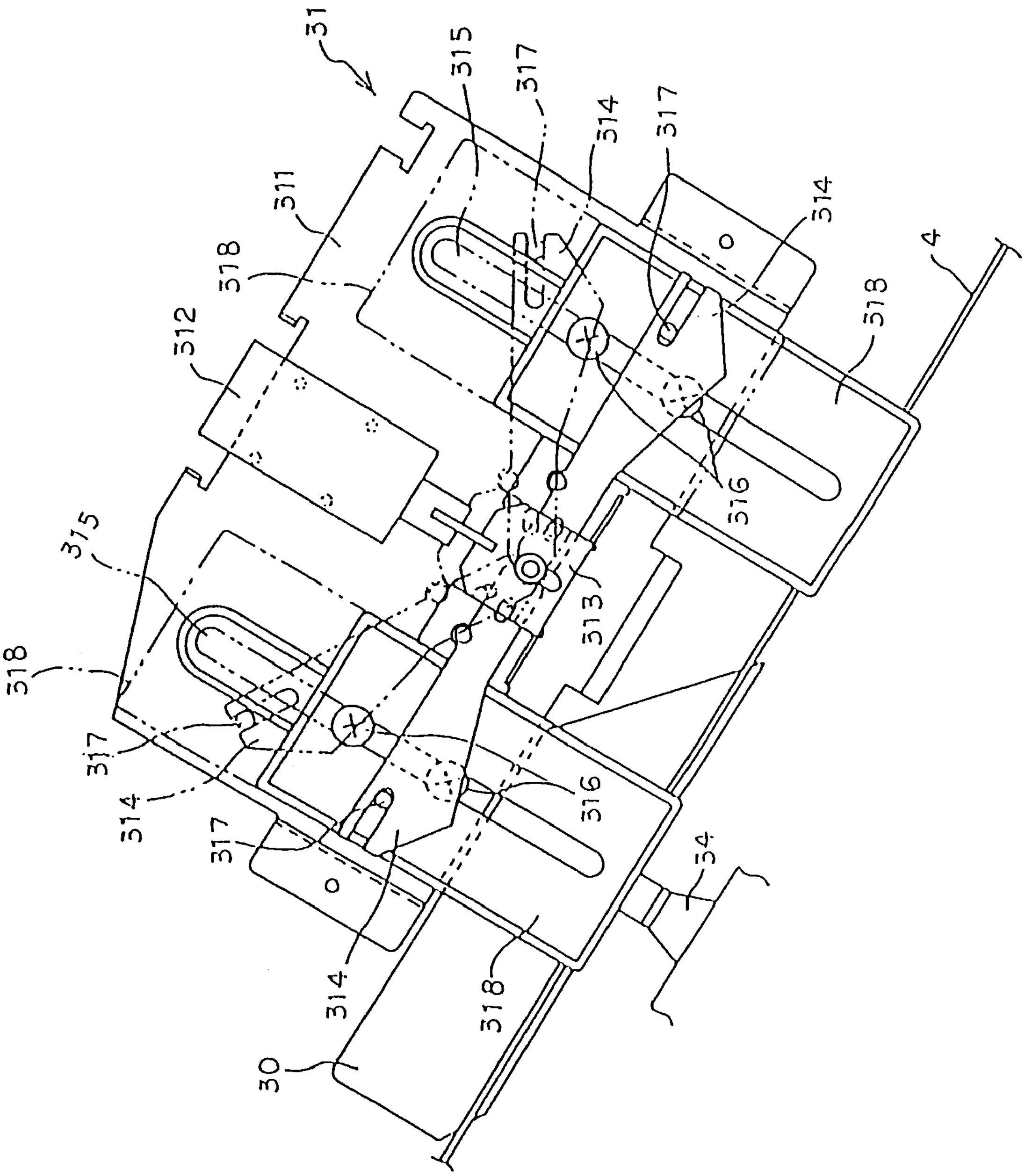
FIG. 16 is an enlarged front view showing a reference plate in the sheet processing device.

As shown in FIG. 16, the reference plate 31 is provided with a fixed plate 311 fixed to an inner wall of the post-processing device unit 20; a shutter solenoid 312 held by the fixed plate 311, an interconnection plate 313 provided on a tip end of the shutter solenoid 312; a pair of arms 314 having one ends interconnected to the interconnection plate 313; and shutter plates 318 interconnected to the other ends of the arms 314 via interconnection pins 316 and 317 for converting rotational movement of the arms 314 to linear movement via guide grooves 315 formed in the fixed plate 311. Additionally, in the process of conveying one sheet bunch S' from the processing tray 4 to the accumulating tray 9A or 9B, when a sheet S forming a base of the next sheet bunch S' is discharged onto the processing tray 4, in order to match the base sheet S, the shutter solenoid 312 rotates the arms 314 in such a manner that the shutter plates 318 abut on a top surface of the sheet bunch S' being conveyed.

Figure 11:
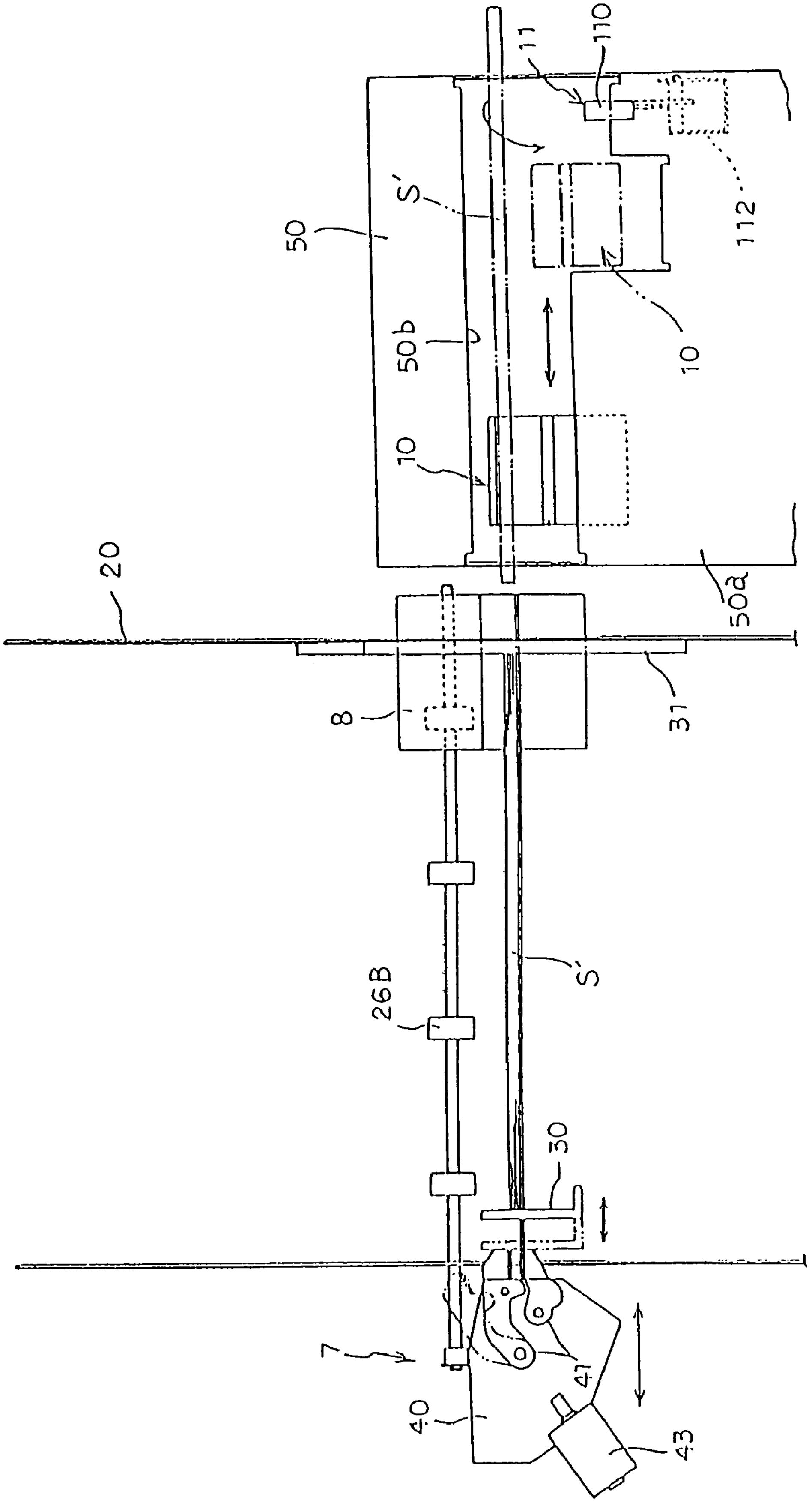
FIG. 11 is a schematic front view of the sheet processing device.

The first holding means 7 holds a rear-end portion of the sheet bunch S' matched on the processing tray 4 from above and below to convey the sheet bunch S' in a conveying direction B orthogonal to the discharge direction A. Furthermore, in the first holding means 7, as shown in FIG. 11, a moving frame 40 is provided with upper and lower holding levers 41 which are opened/closed. A detailed mechanism is not shown, but when a bunch pressing solenoid 43 operates, one side of the sheet bunch S' is held by the holding levers 41. Moreover, the holding levers 41 are advanced/retreated by a holding lever motor 42 of FIG. 17.

Figure 14:
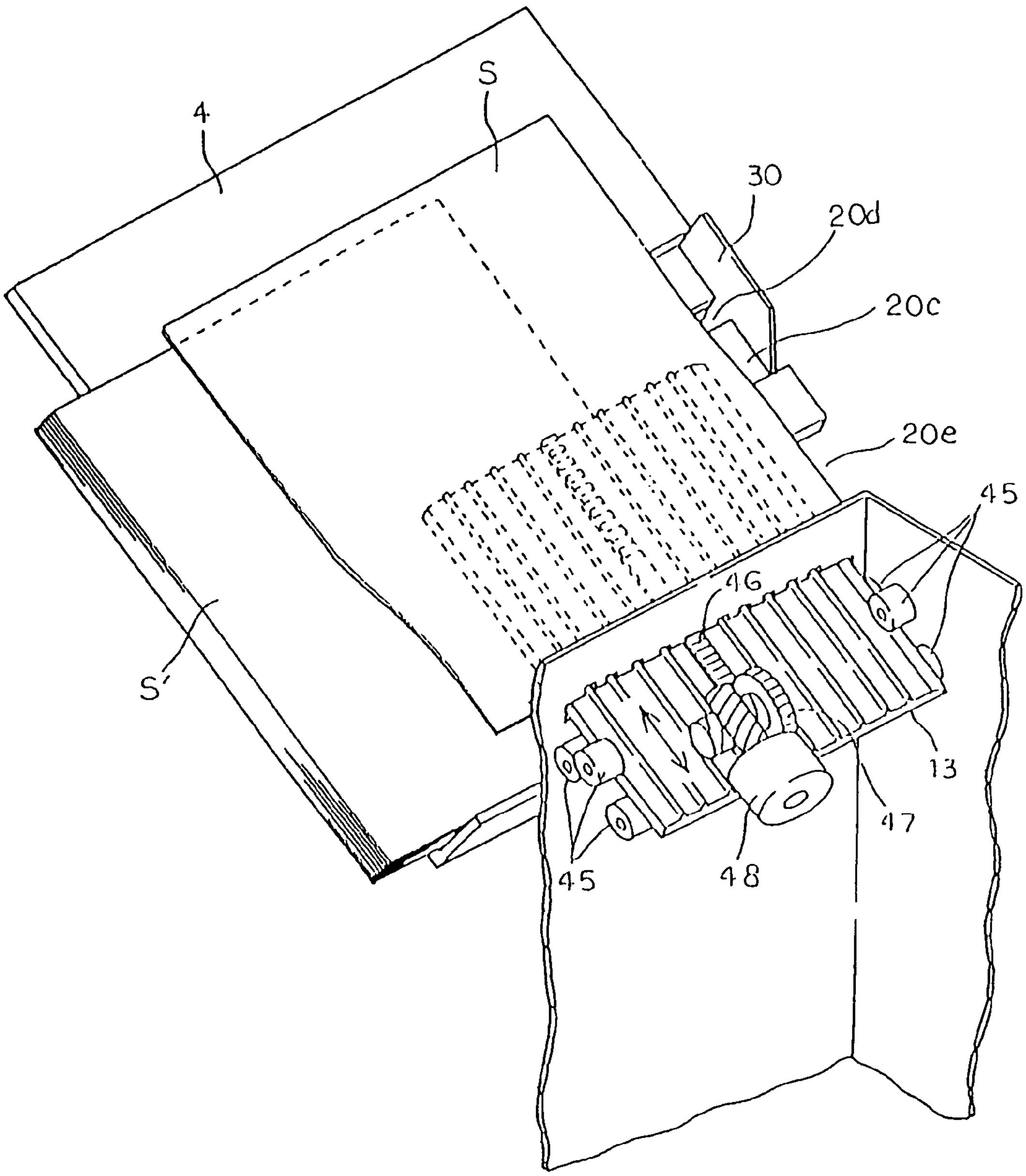
FIG. 14 is a perspective view of an auxiliary tray in the sheet processing device.

Above the processing tray 4 the auxiliary tray 13 formed in a flat plate as shown in FIGS. 4 and 14 is disposed between the processing tray 4 and the pair of discharge rollers 26A and 26B which are rotated by a conveying motor 19. The auxiliary tray 13 is shorter and narrower than the processing tray 4, and disposed in a reference position of the processing tray 4 in such a manner that the auxiliary tray 13 can advance/retreat. Specifically, opposite end portions of the auxiliary tray 13 are slidably supported by upper and lower guide rollers 45, a pinion gear 47 is engaged with a rack 46 in a middle portion, and the auxiliary tray 13 is slid by the pinion gear 47 operatively interconnected to an auxiliary tray motor 48. Additionally, FIGS. 4 and 14 show that the auxiliary tray 13 is moved forward.

When a series of sheet bunches S' is discharged onto the processing tray 4 and the sheet bunch S' is matched, the auxiliary tray 13 is moved forward before the next series of sheets S is conveyed. By receiving the next sheets S, the auxiliary tray 13 separates the sheets S from the sheet bunch S' being conveyed (being stapled).

Figure 15:
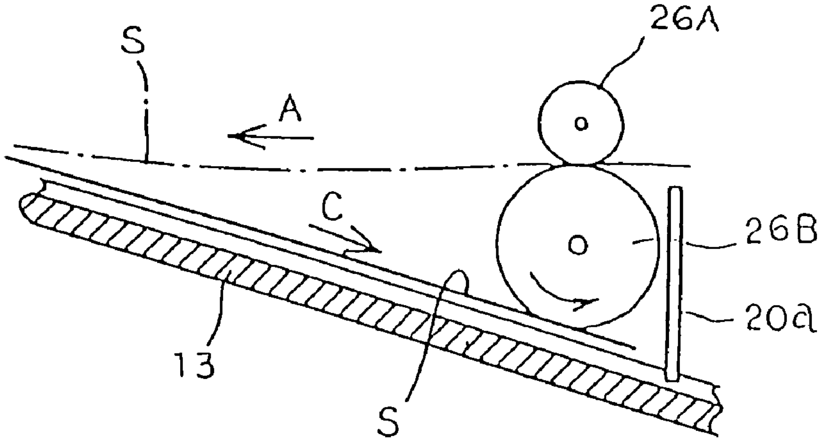
FIG. 15 is an explanatory view showing an operation of the auxiliary tray in the sheet processing device.

As shown in FIG. 15, the auxiliary tray 13 also has a returning function of conveying the sheet S in a returning direction C opposite to the discharge direction A when the sheet S is laid on the auxiliary tray 13. The returning function is performed by the discharge roller 26A and the discharge roller 26B which elastically abuts on the discharge roller 26A. Additionally, the diameter of the discharge roller 26B is larger than that of the discharge roller 26A, and the discharge roller 26B is formed of a soft material. When the outer peripheral face of the discharge roller 26B lightly abuts on the sheet S on the auxiliary tray 13, the tip end of the sheet S is forwarded in the returning direction C to abut on the contact plate 20*a*.

Furthermore, since the auxiliary tray 13 is loaded only with about one or two sheets S, a mechanism which is adapted to changes in thickness of the sheet S is unnecessary. Moreover, a timing of advancing/retreating the auxiliary tray 13 is set based on a detection result of the sensor 17 of FIG. 4 disposed on the upstream side of the discharge direction of the sheet S discharged by the discharge means or rollers 26A and 26B for detecting that the tip end of the sheet discharged by the discharge rollers 26A and 26B reaches the processing tray 4 or a position above the previous sheet S accumulated on the processing tray 4.

Specifically, as shown in FIG. 3, the plural rail grooves 20*c*, 20*d* and 20*e* in the processing tray 4 are extended in a direction orthogonal to the conveying direction of the sheet S. Therefore, in the case where no sheet S is accumulated on the processing tray 4, if the first sheet S is directly discharged on the processing tray 4, the tip end of the sheet S is buckled or caught in the rail groove 20*c*, 20*d* or 20*e* in accordance with the height of the processing tray 4, or another problem occurs. Additionally, even when the sheets S are accumulated on the processing tray 4, the tip end of the next sheet S abuts on the previous sheet S and is buckled. Furthermore, the aforementioned sheet bunch S' needs to be separated from the next sheet S.

To solve the aforementioned problem, by detecting the tip end of the sheet S by the detecting sensor 17, the auxiliary tray 13 is advanced, while by detecting the rear end of the sheet S by the detecting sensor 17, the auxiliary tray 13 is retreated.

In this case, it can be assumed that plural sheet sizes are mixed in one sheet bunch S'. For this, based on the sheet size information transmitted from the copying machine 2 and the sheet detection result of the detecting sensor 17, the retreating timing of the auxiliary tray 13 by means of the auxiliary tray motor 48 is set earlier as the sheet size is larger according to the sheet size information transmitted from the copying machine 2. Thereby, the sheet is prevented from being buckled in accordance with the sheet size. Additionally, even if sheet sizes are not mixed, the retreating timing may be set earlier when the sheet size is larger than an optional sheet size (e.g., A4 sideways) as a reference.

When the sheet bunch S' on the lower processing tray 4 is conveyed to the accumulating tray 9A or 9B, the auxiliary tray 13 is retracted substantially simultaneously with completion of conveyance to the accumulating tray 9A or 9B, thereby dropping the sheet S on the auxiliary tray 13 down to the processing tray 4.

As shown in FIG. 14, when a relatively large-sized sheet S is conveyed to the processing tray 4, the sheet S on the auxiliary tray 13 is supported in such a manner that the sheet S hangs from the auxiliary tray 13 onto the processing tray 4. Additionally, when a small-sized sheet S is conveyed, the sheet S can be received only by the auxiliary tray 13.

The stapler 8 staples the vicinity of edges of the sheet bunch S' with staples (stapling needles), and is disposed in the vicinity of the front end portion of the vertical wall 20*a* of the processing tray 4 on the side of the accumulation processing device unit 50.

Stapling positions and the number of portions of the sheet bunch S' to be stapled by the stapler 8 are reached by conveying the sheet bunch with the first and second holding means 7 and 10. Specifically, when one portion of the sheet bunch is stapled, the sheet bunch is held and conveyed by the first holding means 7, stopped when the portion is aligned with the stapler 8 and stapled. When two portions are stapled, the sheet bunch is held and conveyed by the first holding means 7, and the first portion is aligned with the stapler 8 and stapled. Subsequently, after the second holding means 10 in turn holds the sheet bunch, the second portion is aligned with the stapler 8 and stapled. Additionally, by providing the stapler 8 movably along the discharge direction A, portions to be stapled by the stapler may be variable.

The accumulating trays 9A and 9B are deviated ahead of the processing tray 4 or in a direction orthogonal to the discharge direction A and arranged in parallel with each other, and recesses 9C and 9D for taking the trays are formed in top-surface side edges of the accumulating trays. The accumulating trays 9A and 9B are also provided with sheet presence detecting sensors 9E and 9F.

As shown in FIGS. 5 and 6, the accumulating trays 9A and 9B are arranged in such a manner that the trays are raised/lowered along side walls 50L and 5OR of the accumulation processing device unit 50, and the vertical wall 50*a* of the accumulation processing device unit 50 is an accumulation reference plane. The accumulation reference plane is set at a distance d (refer to FIG. 10) in the discharge direction A from the vertical wall 4*a* of the processing tray 4.

Opposite transverse ends of the accumulating tray 9A or 9B are fixedly supported by the side walls 50L and 50R of a U-shaped elevating frame 52, and opposite rollers 53 of the elevating frame 52 are vertically movably guided along vertical grooves 54 formed in the side walls 50L and SOR.

Furthermore, upper and lower frames 62 and 63 on the rear side of the accumulation processing device unit 50 are provided with pulleys 55 and 56, a belt 57 is extended between the upper and lower pulleys 55 and 56, and a follower gear 58 fixed to a rotation shaft of the pulley 55 is engaged with a drive gear 59 of an accumulating tray motor 60 to rotate and operate the upper pulley 55. The elevating frame 52 is fixed halfway to the belt 57 with a fixture 52*a*, and vertically moved as the belt 57 runs.

A spring 65 is also attached between the elevating frame 52 and the upper fame 62, an upward carrying force is obtained from a biasing force of the spring 65, and an alleviating mechanism is constituted in which the weight of the sheet bunch S' on the processing tray 4 is prevented from excessively acting on the accumulating tray motor 60.

The elevating frame 52 is provided with a transmission type upper tray position detecting sensor 61 and a lower tray position detecting sensor 64, so that the positions of the accumulating trays 9A and 9B can be detected dependent on whether or not light is interrupted by a shielding plate 66 attached to the side wall 50R.

Figure 12:
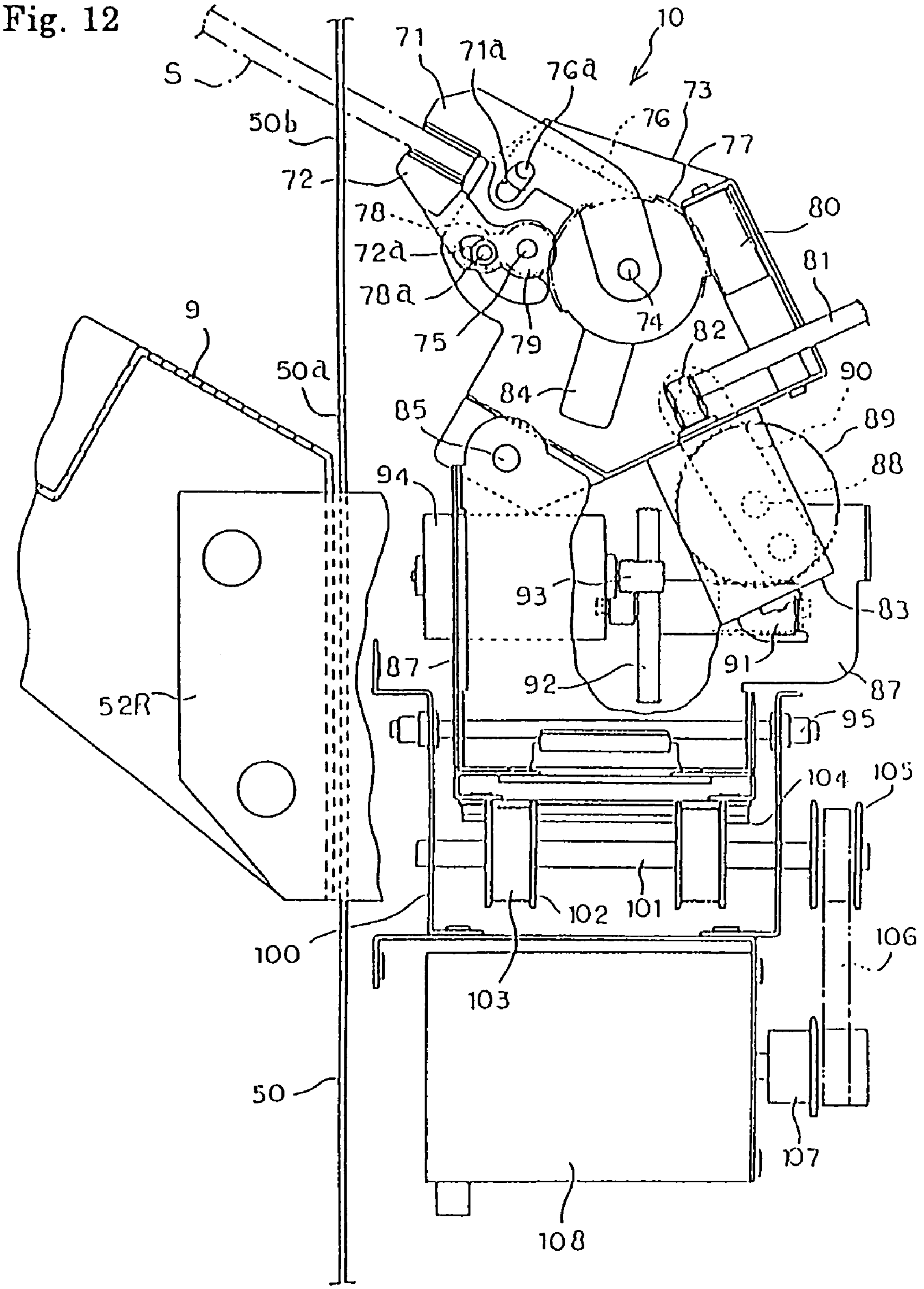
FIG. 12 is an enlarged sectional side view showing a main portion of a second holding means in an initial condition in the sheet processing device.
Figure 13:
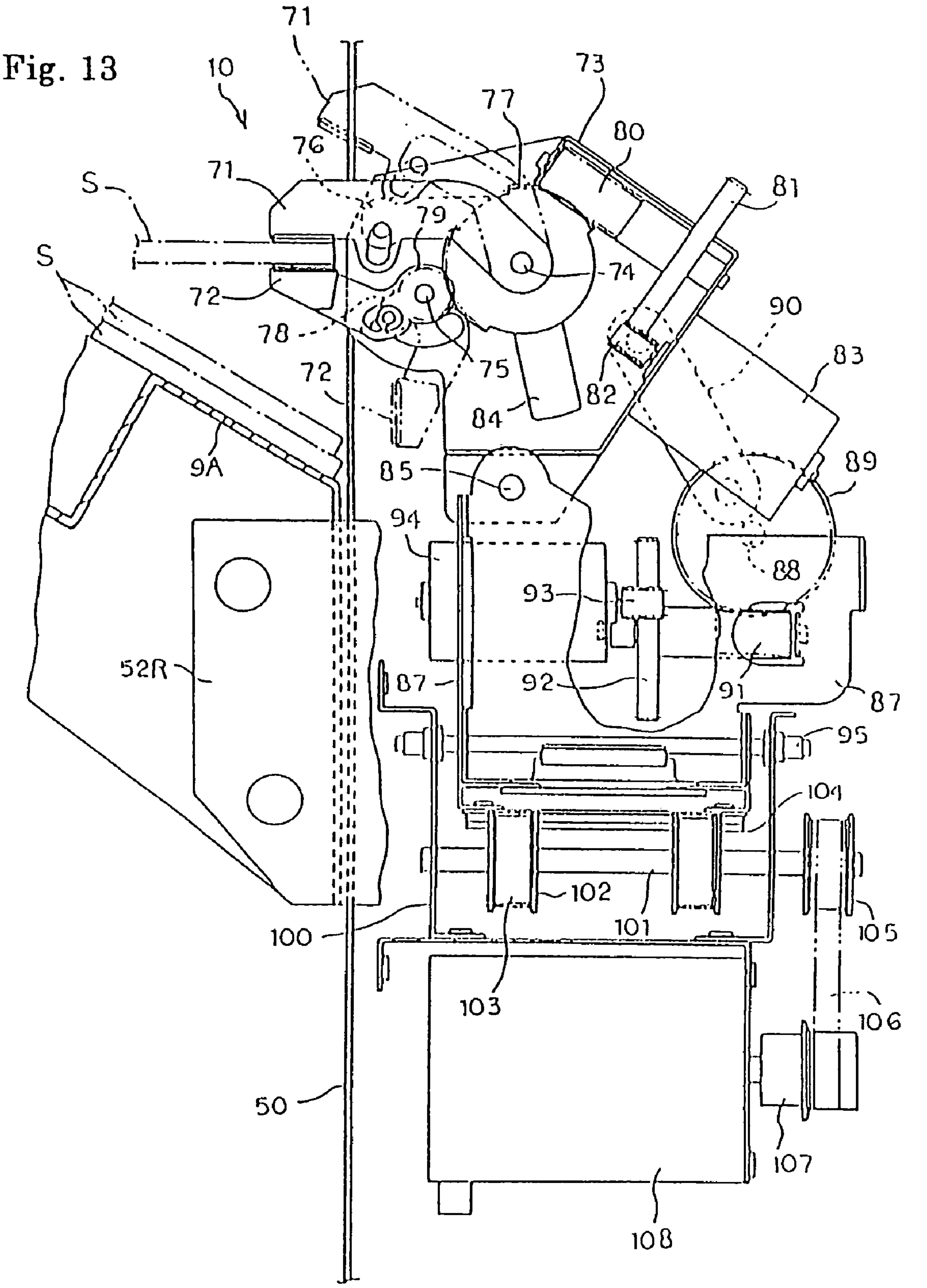
FIG. 13 is an enlarged sectional side view showing a main portion of the second holding means dropping a sheet bunch in the sheet processing device.

As shown in FIGS. 12 and 13, the sheet held by the first holding means 7 is conveyed and pushed from the processing tray 4 onto the accumulating tray 9A or 9B via the second holding means 10. The second holding means 10 also has upper and lower holding levers 71 and 72 for pressing with planes and holding top and under surfaces of the sheet bunch S'. The sheet bunch S' is held/released by an opening/closing mechanism, and the held sheet bunch S' is conveyed by a conveying mechanism in the conveying direction B orthogonal to the discharge direction A. Furthermore, a portion of the sheet bunch S' held in an inclined condition is swung horizontally by a swinging mechanism, and simultaneously moved slightly toward the accumulating tray 9A or 9B.

First, a proximal end of the upper holding lever 71 is rotatably supported by a first shaft 74 relative to a swinging frame 73, and the lower holding lever 72 is rotatably supported via a second shaft 75 by the swinging frame 73. A first arm 76 is supported by the first shaft 74 and rotated integrally with a partial gear 77, and a tip end pin 76*a* of the first arm 76 is engaged in a groove 71*a* in the upper holding lever 71 and operated to open/close. Similarly, a second arm 78 is supported by the second shaft 75, and a tip end pin 78*a* of the second arm 78 is engaged in a groove 72*a* in the lower holding lever 72 and operated to open/close. Additionally, a gear portion 79 is attached to a pivotal portion of the second arm 78, and engaged with the partial gear 77 of the first arm 76 to rotate the upper and lower holding levers 71 and 72 when the arms 76 and 78 are linked and rotated.

A pinion gear 80 supported by the swinging frame 73 is engaged with another portion of the partial gear 77, and a drive gear 82 of an opening/closing motor 83 with the swinging frame 73 attached thereto is engaged with an intermediate gear 81 rotated integrally with the pinion gear 80 to constitute an opening/closing drive mechanism. Additionally, for the opened/closed condition of the upper and lower holding levers 71 and 72, an operation piece 84 rotated integrally with the upper holding lever 71 is detected by a sensor (not shown).

When the second holding means 10 is opened/closed, the upper and lower holding levers 71 and 72 are different from each other in open angle because the diameter of the partial gear 77 of the upper holding lever 71 is large and the diameter of the gear portion 79 of the lower holding lever 72 is small. The upper holding lever 71 is opened by about 30°, while the lower holding lever 72 is opened downward by about 90° (refer to FIG. 13).

A lower end of the swinging frame 73 is swingably supported via a swinging shaft 85 by a moving frame 87. A rotary gear 89 is supported via a shaft 88 parallel with the swinging shaft 85 by the moving frame 87. An eccentric portion of the rotary gear 89 and a rear portion of the swinging frame 73 above the swinging shaft 85 are interconnected by a linkage 90. When the rotary gear 89 is rotated, the swinging frame 73 is swung via the linkage 90 to a retreated position of FIG. 12 or a protruded position of FIG. 13.

An outer peripheral gear portion of the rotary gear 89 is engaged with a pinion gear 91 supported in a direction orthogonal to the swinging shaft 85 by the moving frame 87, and an intermediate gear 92 integral with the pinion gear 91 is engaged with a drive gear 93 of a swinging motor 94 attached to the moving frame 87 to constitute a swinging mechanism.

In a conveying mechanism of the moving frame 87, a running member 95 transversely protruded before and after the moving frame 87 is engaged in a guide groove (not shown) extended back and forth in a guide frame 100 fixed to the device unit 50, and the moving frame 87 is supported in such a manner that the moving frame can move back and forth (in the conveying direction B).

Inside the guide frame 100 front and back pulleys 102 are supported by a pulley shaft 101 (another is not shown) and belts 103 are extended between the opposite pulleys. The moving frame 87 is fixed via a clamp member 104 to portions of the belts 103, a follower pulley 105 is fixed to an end of the pulley shaft 101, and a drive belt 106 is extended between the follower pulley 105 and a drive pulley 107 of a drive shaft of a conveying motor 108 attached to an under portion of the guide frame 100.

By rotating the conveying motor 108 forward or reversely, the moving frame 87 is advanced or retreated in the conveying direction B together with the second holding means 10. An initial position (home position) of the second holding means 10 is a receiving position closer to the processing tray 4, and the second holding means 10 is moved among the receiving position, an intermediate stop position for stapling the sheets with the stapler 8 and a most advanced release position. The second holding means 10 is opened/closed in the initial and release positions, and swung in the release position.

Furthermore, the conveying mechanism and the opening/closing and swinging mechanisms of the second holding means 10 are arranged inside a covering of the accumulation processing device unit 50, so that movement ranges are covered. The slit-like horizontal opening 50*b* is formed in an upper portion of the covering, and the second holding means 10 holding the sheet bunch S' moves along the horizontal opening 50*b*. Additionally, the swung upper and lower holding levers 71 and 72 are protruded from a release end.

As shown in FIG. 5, in the sheet height detecting means 11, a rotating detector 110 having a circular arc-shaped tip end is supported by the fixed frame, and protruded/retracted and rotated via a spring 111 when an actuator 112 is operated. The tip end of the rotating detector 110 can make contact with the top surface of the sheet bunch S' on the accumulating tray 9A or 9B, the top-surface position of the sheet bunch S' on the processing tray 4 is detected with the rotation quantity, and the rising/lowering of the processing tray 4 is controlled.

Operations of the mechanisms are linked and controlled in a control unit. On a control panel the number of sheets, the setting number, the necessity of stapling, the stapling position and the like are set by an operator. Operation of each section is controlled based on the setting.

When the accumulating tray 9A passes the horizontal opening 50*b* and is inclined, the shutter 15 prevents the sheet bunch S' on the accumulating tray 9A from being caught by or going into the horizontal opening 50*b*. The shutter 15 is provided with a shutter plate 16 for opening/closing the horizontal opening 50*b* and a drive section 18 for raising/lowering the shutter plate 16.

As shown in FIG. 9, long holes 16A are formed in upper and lower portions of opposite sides of the shutter plate 16 and, as shown in FIG. 8, the shutter plate 16 is vertically movably supported by pins 16B attached to the side walls 50L and 50R. The shutter plate 16 is also provided with a horizontal opening 16C and openings 16D to 16F.

As shown in FIG. 9, the opening 16D is covered with a movable plate 16J rotatably supported via a shaft 16H in a long hole 16G and, as shown in FIG. 5, the plate 16J is pushed out by rotation/operation of the second holding means 10.

Opposite sides of an elevating plate 16K are liftably supported by guides 16L in the opening 16E and, as shown in FIG. 5, the elevating plate 16K is pushed down by the rotation/operation of the second holding means 10. The elevating plate 16K is reset by a spring 16M. Therefore, when the second holding means 10 is not rotated, the movable plate 16J and the elevating plate 16K are closed safely.

The opening 16F is a hole via which the rotating detectors 110 and 14A of the sensors 11 and 14 go in/out.

The shutter plate 16 is also provided with a rack 16N, an opened position detecting lever 16P and a closed position detecting lever 16Q.

On the other hand, a support frame 18A is horizontally attached between the side walls 50L and SOR, and there are the drive section 18, a sensor 18B for detecting the opened position detecting lever 16P and a sensor 18C for detecting the closed position detecting lever 16Q.

The drive section 18 is provided with a pulse motor 18D, a timing pulley 18E, a timing belt 18F, a timing pulley 18G and a pinion 18H engaged with the rack 16N.

When a copying operation is started, the shutter plate 16 is lowered, and the horizontal opening 16C is aligned with the horizontal opening 50*b* and opened. When the copying of the set number of sheets is completed, the shutter plate 16 is raised to close the horizontal opening 16C.

Figure 17:
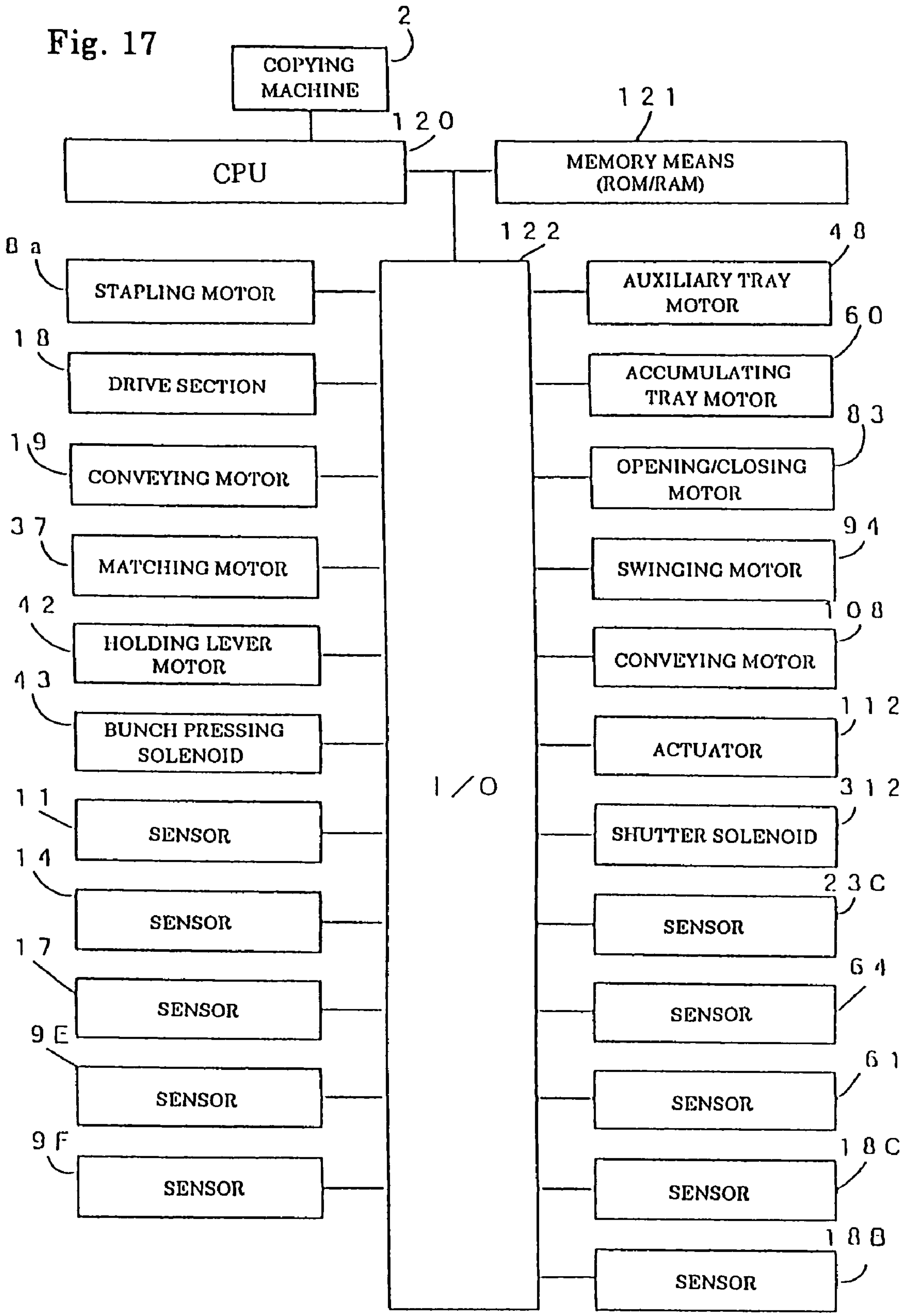
FIG. 17 is a block diagram of a control system in the sheet processing device.

In the aforementioned drive system, as shown in FIG. 17, in response to input/output signals from a CPU 120 and a memory means 121 such as a ROM, a RAM and the like, a parallel I/O 122 is operated and controlled.

Figure 18:
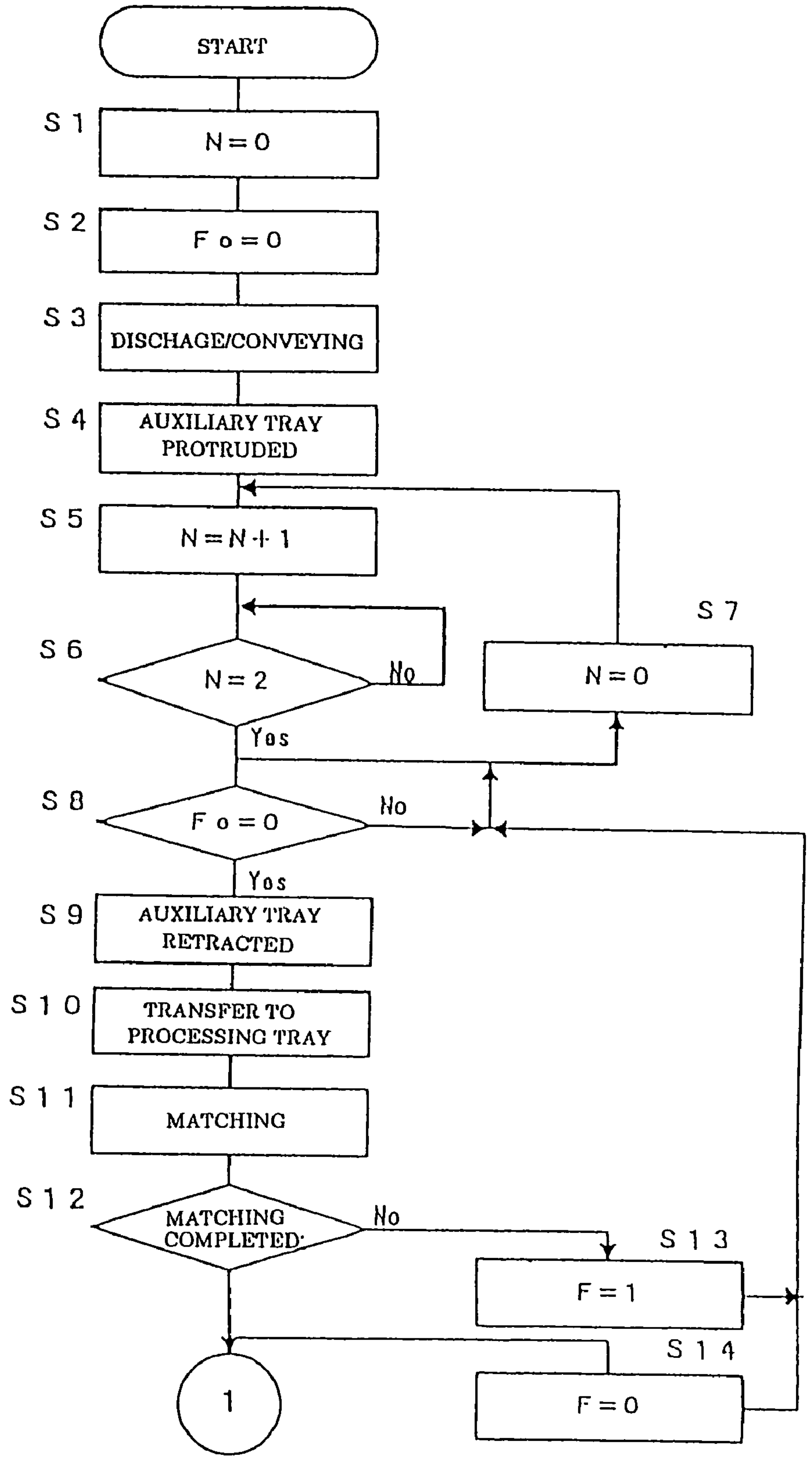
FIG. 18 is a first-half flowchart showing postprocessing processes of the sheet processing device.
Figure 19:
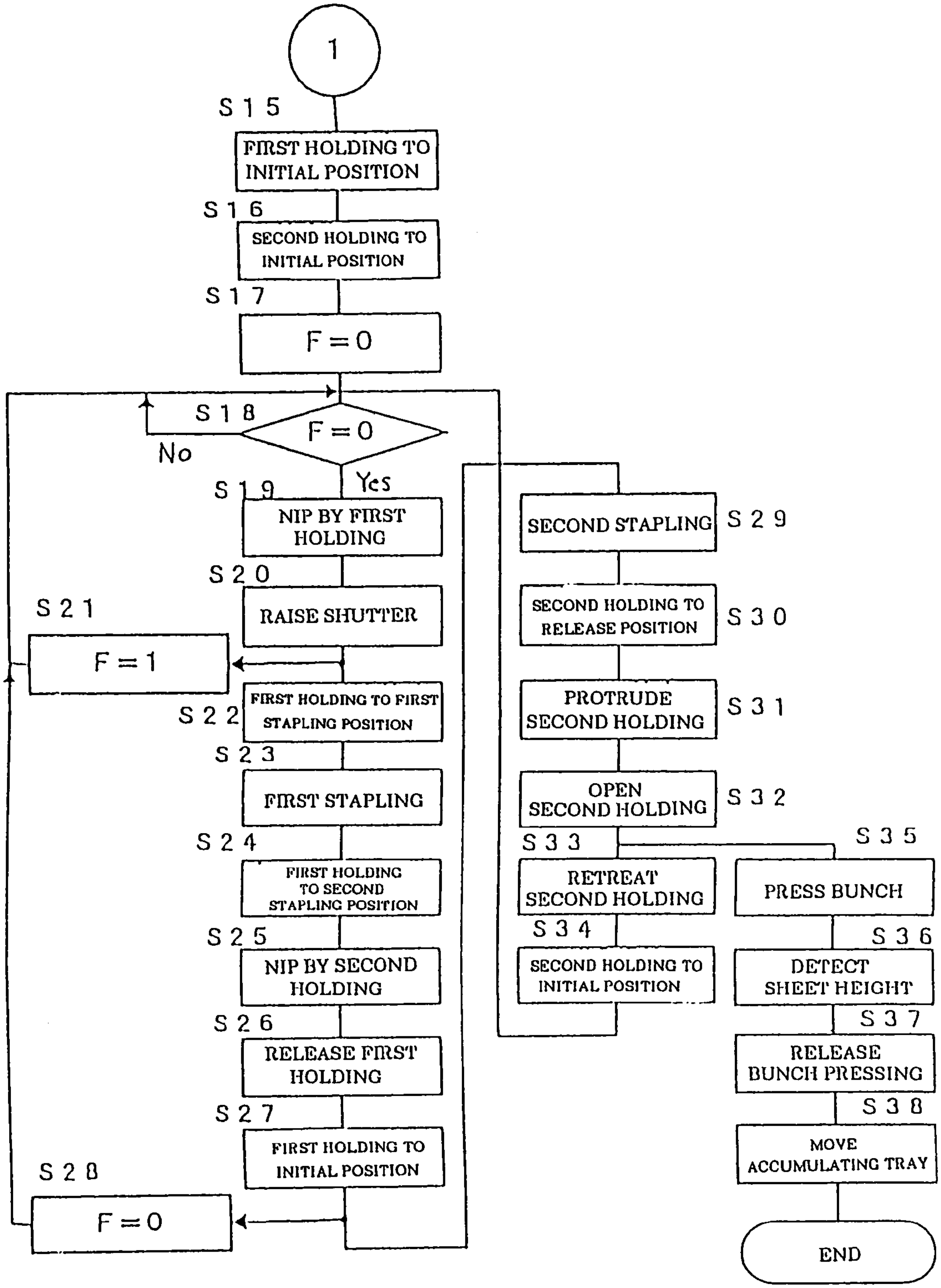
FIG. 19 is a latter-half flowchart showing the postprocessing processes of the sheet processing device.
Figure 20:
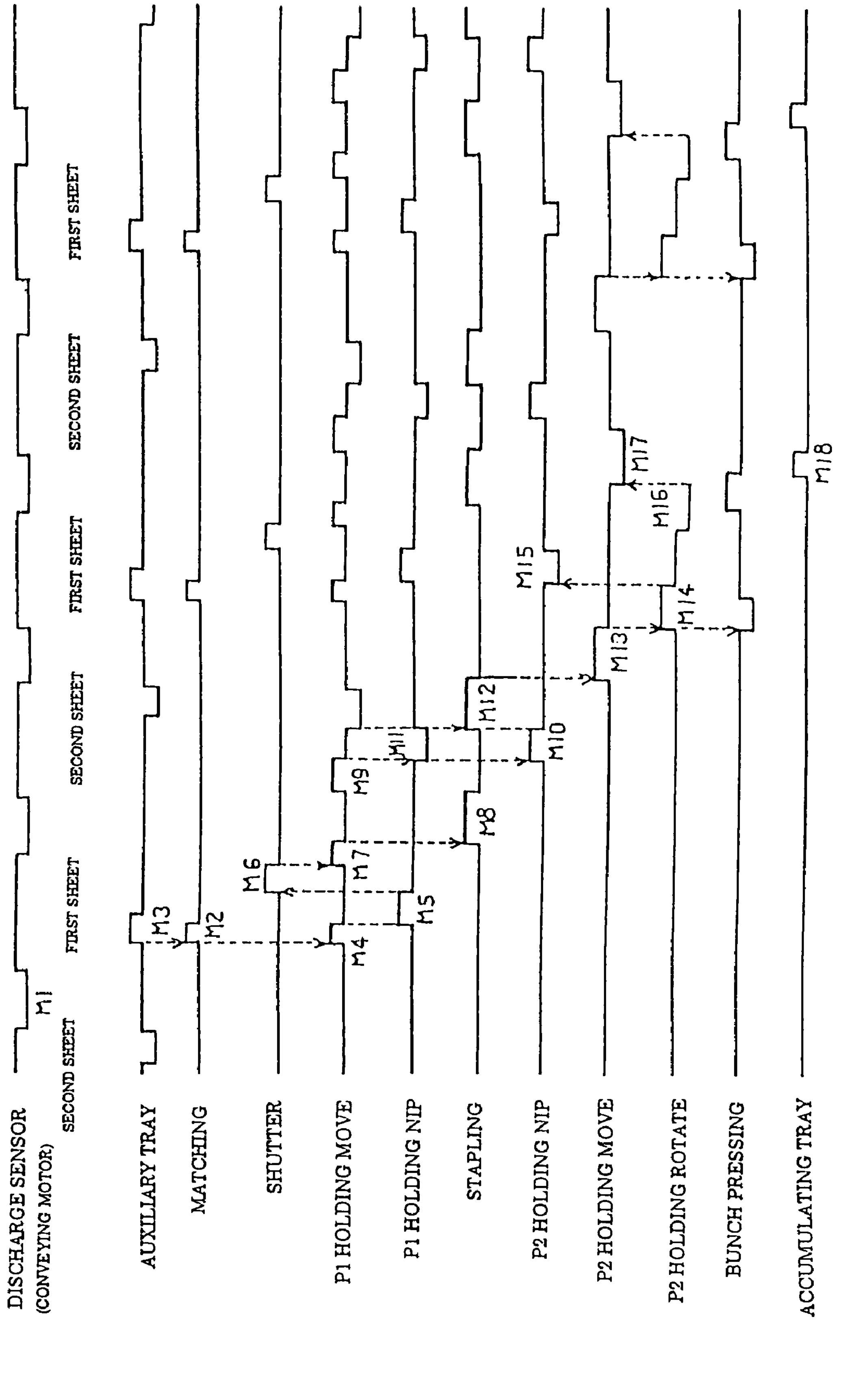
FIG. 20 is a timing chart showing the postprocessing processes of the sheet processing device.

A post-processing process of the sheets S will be described with reference to FIGS. 18 to 21. Additionally, in a flowchart of FIGS. 18 and 19 showing a series of post-processing processes and a timing chart of FIG. 20, after stapling two sheets S (the same size) into a sheet bunch S', the bunch is accumulated. Furthermore, a numeral affixed to a code M in FIG. 20 indicates operation division or time in each section.

Dependent on conditions of the sheet presence detecting sensors 9E and 9F of the accumulating trays 9A and 9B and the tray position detecting sensors 61 and 64, either of the two trays 9A and 9B is moved to the discharge port. When an image forming operation of the image forming device 2 is started, the motor 18D is operated, the shutter plate 16 is lowered, the opened position detecting lever 16P is detected by the sensor 18B, then the motor 18D is stopped. In this condition, the horizontal opening 50*b* is aligned with the horizontal opening 16C of the shutter plate 16 and, as shown in FIG. 1, the opening 50*b* is opened.

In the flowchart, in an initial setting, the conveyed number of sheets discharged from the image forming device 2 is set to N=0, and a sheet matching flag is set to F0=0 (matching completed) by assuming that previously conveyed sheets are completely matched (S1, S2). The sheets S are successively discharged from the image forming device 2 (S3). In this case, the auxiliary tray 13 is protruded, the sheets are conveyed to increase the value of N and a series of plural sheets (two sheets) S are piled (S4, S5, S6) and the value is set to N=0 for the subsequent conveying (S7). When it is judged that the sheets are completely matched (S8), the auxiliary tray 13 is retracted, and the sheet bunch S' is dropped and stored onto the processing tray 4 (S9, S10), a lower inclined side of the sheet bunch S' abuts on the reference surface 4*a* as a storage end face and the sheet bunch S' is aligned in its transverse direction (Ml: operation of a discharge sensor (not shown) and the conveying motor). Subsequently, the matching members 30 are moved to push the rear side of the sheet S and push the front side thereof onto the reference plates 31, so that the sheet S is matched in its back and forth direction (S11, M2: matching). During the matching of the sheet S (F0=1), the auxiliary tray 13 is protruded when the next series of sheets S is conveyed in (M3), and the sheet S is held to be separated from the sheet being matched/conveyed below (S11–S14).

Figure 21:
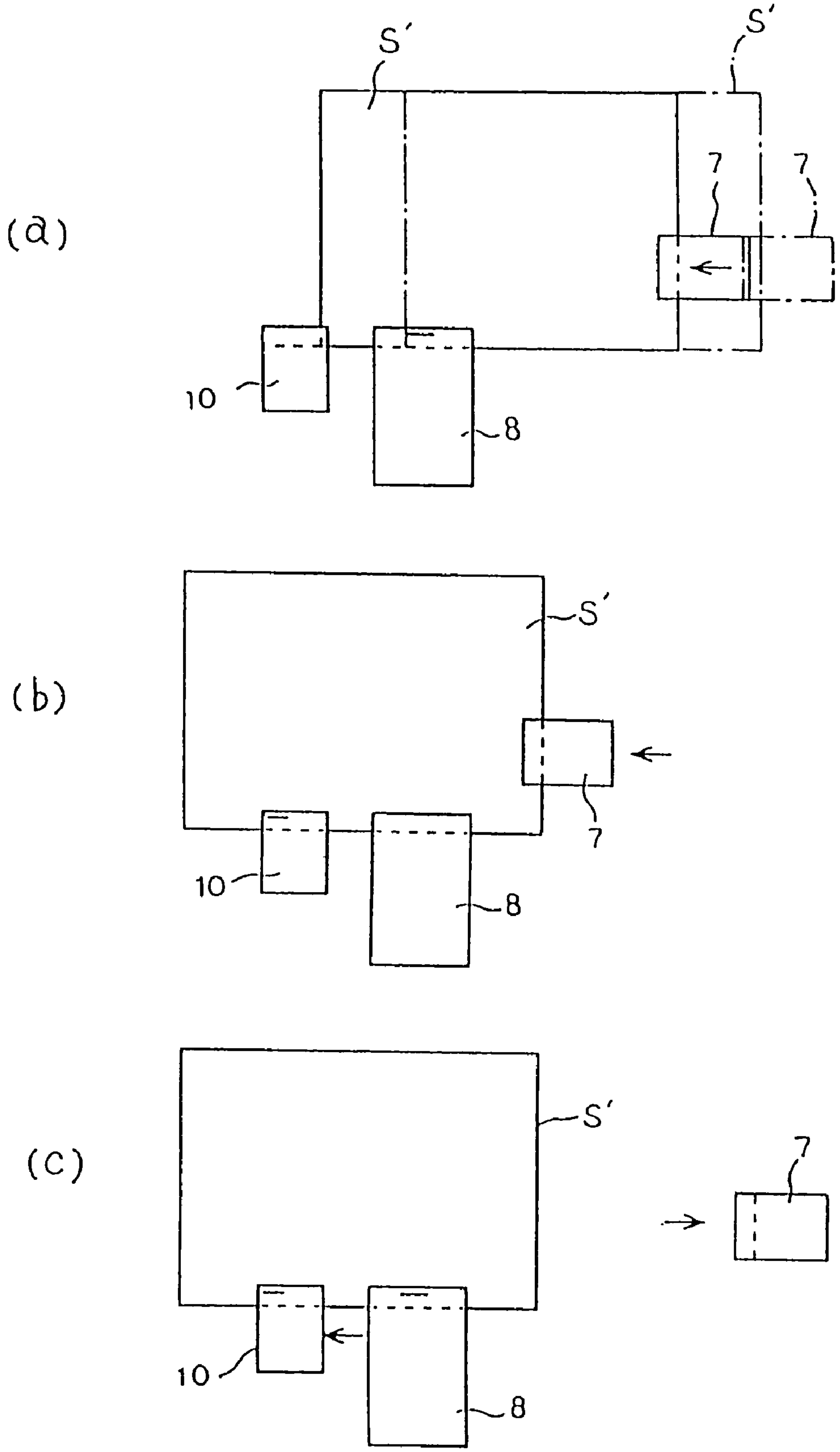
FIGS. 21A to 21C are explanatory views showing post-processing processes for transferring a sheet bunch from a processing tray to an accumulating tray in the sheet processing device in time series.

FIG. 21 shows a stroke in which the sheet bunch S' is transferred from the first holding means 7 over to the second holding means 10 while the sheet bunch S' on the processing tray 4 is conveyed toward, for example, the accumulating tray 9A (to the left as seen in FIG. 21). FIGS. 21A to 21C show that the conveying of the sheet bunch S' successively progresses, and the second holding means 10 and the stapler 8 are in fixed positions in the movement stroke.

When matching is performed, the first holding means 7 moves to an initial position (shown by a solid line of FIG. 10) (S15, M4). Moreover, at this time the second holding means 10 is in the initial position (shown by the solid line of FIG. 10) (S16). Here a flag indicating whether or not the sheet bunch S' is being transferred is set to F1=0 (not being transferred) (S17). In the matched condition, the rear side of the sheet bunch S' is held (nipped) by the first holding means 7 (S18, S19, M5, shown by a chain line in FIG. 21A).

The reference plates 31 (shutters) are raised (S20, M6). When a new sheet bunch S' is conveyed (F1=1, S21), the sheet bunch S' is allowed to move in the conveying direction B. Subsequently, the first holding means 7 is operated to move forward by a predetermined quantity, the sheet bunch S' is moved to a first stapling position in a direction of the accumulating tray 9A intersecting the discharge direction A (S22, M7, shown by a solid line in FIG. 21A) and the first portion is stapled by the stapler 8 (S23, M8). Additionally, the reference plates 31 are raised until the sheet bunch S' is conveyed in, then immediately lowered. In the lowering condition, the sheet bunch S' is lightly pressed, so that the sheet bunch S' can pass.

Subsequently, the first holding means 7 further moves forward and stops in a second stapling position (S24, M9, FIG. 21B, condition shown by a solid line in FIG. 3). The second holding means 10 is then stopped in the initial position on the side of the processing tray 4 (position shown by a solid line in FIG. 10 or 11), swung to a retreated position of FIG. 12 until the first holding means 7 stops, and receives and holds the reference-position side of the tilted sheet bunch S' while being stopped (S25, M10).

After the second holding means 10 holds the sheet bunch S' as aforementioned, the first holding means 7 is released (S26, M11, FIG. 21C), returns to a holding position (shown by the solid line in FIG. 10) to hold the next sheet bunch S' (S27) and allows the next sheet bunch S' to be transferred (S28). Subsequently, the second portion is stapled by the stapler (S29, M12). In each of the aforementioned stapling positions, the transfer quantity of the first holding means 7 is set based on an operator's instruction.

Subsequently, the second holding means 10 moves forward to a release position (shown by a chain line in FIG. 10 or 11), finishes conveying in the conveying direction B and stops (S30, M13). In the release position, the second holding means 10 is moved from the retreated swung position shown in FIG. 12 to the protruded position shown in FIG. 13, brought in a horizontal holding condition and moved in a direction orthogonal to the conveying direction B (S31, M14). Additionally, when the second holding means 10 swings from the retreated swung position of FIG. 12 to the protruded position of FIG. 13, the movable plate 16J is rotated and the elevating plate 16K is lowered by the second holding means 10.

An end portion of the sheet bunch S' aligned with the reference position on the processing tray 4 is held and conveyed by the second holding means 10 as shown in FIG. 12. When the second holding means 10 swings to the condition shown in FIG. 13, an end of the held sheet bunch S' is moved toward the accumulating tray 9A. The moved position is substantially aligned with the reference plane 50*a* in the accumulating tray 9A. Along with the movement the held sheet end becomes horizontal (M14), the upper and lower holding levers 71 and 72 are released and operated as shown by chain lines (S32, M15), and the held sheet bunch S' is dropped and released downward as it is and piled on the sheet bunch S' already accumulated on the accumulating tray 9A.

In this case, the sheet bunch S' is piled up without its end being largely deviated from the end of the accumulated sheet bunch S' below and without its dropped end being caught in the stapled portion of the sheet bunch S' below.

While the second holding means 10 is opened, the swinging frame 73 is retreated (S33, M16). Subsequently, the second holding means 10 is moved backward along the conveying direction B to return to the initial condition (S34, M17). In this case, even if the next sheet bunch S' is forwarded, the upper and lower holding levers 71 and 72 are sufficiently opened and, therefore, the sheet bunch S' fails to interfere with the upper and lower holding levers 71 and 72. Subsequently, in the initial position, the levers can be closed to hold the next sheet bunch S'.

When the second holding means 10 is swung to the horizontal condition (M14) as aforementioned, the actuator (bunch pressing solenoid) 112 is operated, the rotating detector 110 is placed in the sheet bunch pressing condition (S35), a sheet height is detected (S36), the operation of the actuator 112 is then canceled, and the pressing condition is released (S37, M18). When the accumulating tray 9A is higher than a predetermined position, it is lowered to a predetermined level by the elevating means 12 (S38, M19). Additionally, if an operator takes out the accumulated sheet bunch S' halfway, the accumulating tray 9A is raised in response to detection of the halfway taking sensor 14.

At the time of conveying the sheet bunch S' back and forth, since the second holding means 10 is moved/operated inside the covering, the second holding means 10 and its conveying mechanism fail to interfere with the operator who is trying to take the sheet bunch S' from the accumulating tray 9A. Moreover, since the held sheet bunch S' is conveyed, the matched condition of the sheet bunch S' is not disturbed during conveyance. Here, when it is detected by the sensor 11 that the predetermined number of or more sheets are stored on the accumulating tray 9A, the motor 60 shown in FIG. 5 is operated to raise the elevating frame 52 and stopped when the lower tray 9B moves to its storing position. Additionally, the shutter 15 is closed, and the sheet on the accumulating tray 9A does not go into the horizontal opening 50*b*. Thereafter, sheet bunches are similarly accumulated on the accumulating tray 9B.

Additionally, in the embodiment, the first and second holding means 7 and 10 are constituted of the holding levers for pressing with their planes and holding the sheets, but may be constituted of rollers or other members for pressing and holding the sheets from above and below. The conveying mechanism in each section can be varied, and the actuator can be replaced with a known mechanism.

Furthermore, in the embodiment, the invention is applied to the copying machine 2 as the image forming device, but the invention may be applied to the copying machine 2 in both digital and analog systems. Additionally, it is natural to apply the invention to a printer (including a laser printer), a facsimile machine or other various image forming means (image record device).

Another embodiment of a shielding mechanism of the invention will be described.

Figure 22:
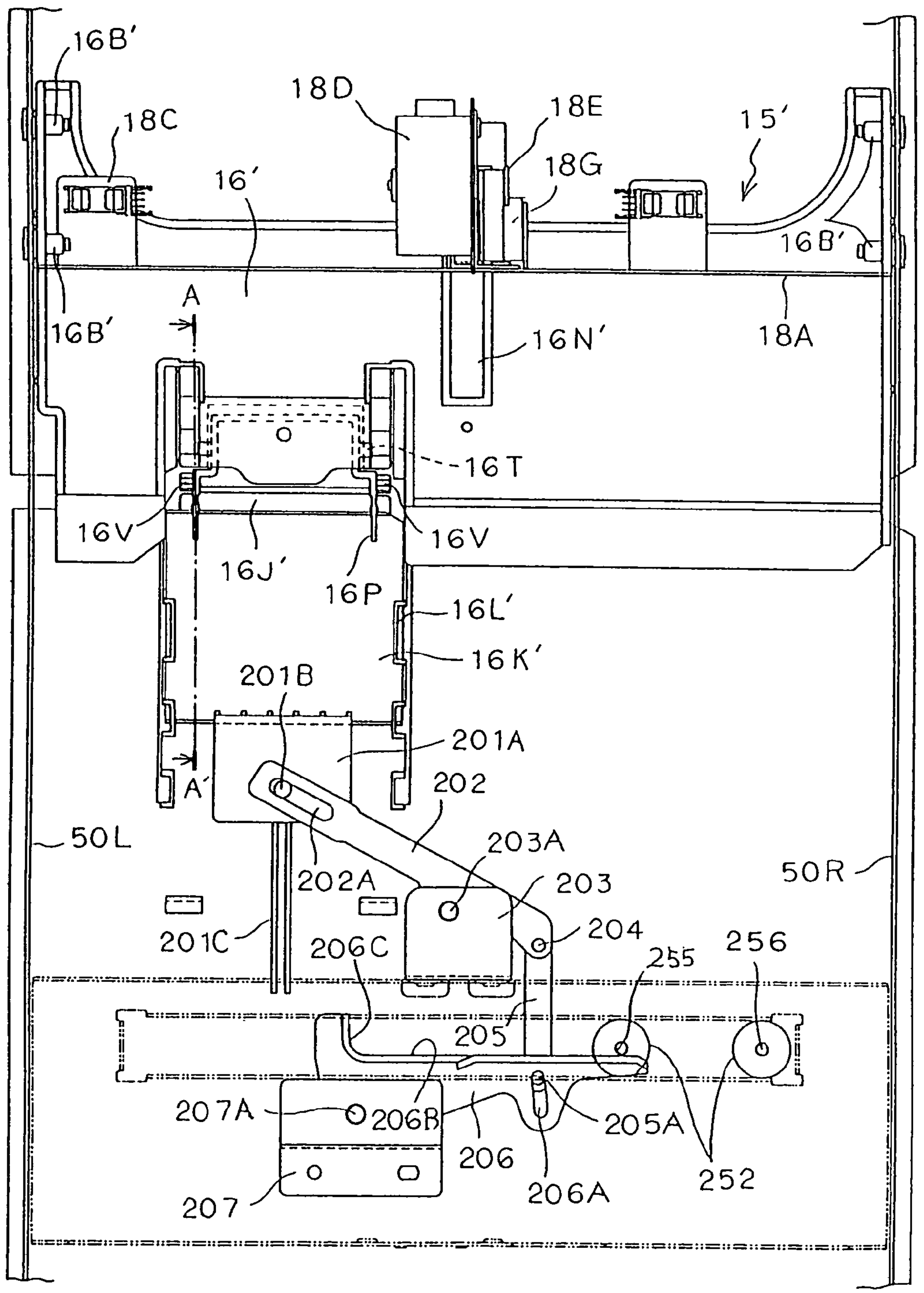
FIG. 22 is a rear view showing a structure of a shutter 15' according to a second embodiment.

FIG. 22 is a rear view showing a structure of a shutter 15' in a second embodiment of the accumulation processing device unit 50. In the same manner as the shutter 15 of the first embodiment, a drive section 18 is provided with a pulse motor 18D, a timing pulley 18E, a timing belt 18F, a timing pulley 18G and a pinion 18H engaged with the rack 16N. A new shutter plate 16' replacing the shutter plate 16 is raised/lowered by the drive section 18. Here, the shutter plate 16' is usually lowered to close the horizontal opening 50*b*, but when a copying operation is started, the shutter plate 16' is raised by the drive section 18 to open the horizontal opening 50*b*, so that the second holding means 10 can move inside the horizontal opening 50*b*. Subsequently, the held sheet bunch is discharged to the accumulating tray 9A or 9B of the accumulation processing device unit 50 and the second holding means 10 returns to its initial position, the shutter plate 16' is lowered to its original position to close the horizontal opening 50*b*, thereby preventing hands or the like from having access into the horizontal opening 50*b*. Additionally, since the mechanism of the drive section 18 is the same as aforementioned, the description thereof is omitted.

The shutter plate 16' is provided with a new movable plate 16J' replacing the shutter plate 16J shown in FIG. 5. The movable plate 16J' is pushed out by rotation of the second holding means 10, and raised/lowered when the shutter plate 16' is raised/lowered.

Below the movable plate 16J' (also referred to as the rotating shutter), a vertically movable elevating plate 16K' (also referred to as the elevating shutter) is disposed. When the shutter plate 16' closes the horizontal opening 50*b* (refer to FIG. 1) as shown in FIG. 22, the movable plate 16J' and the elevating plate 16K' (generically referred to as the vertical opening section) partially intersect each other.

An arm follower plate 201A is fixedly interconnected to the elevating plate 16K'. The arm follower plate 201A; an elevating arm 202, a connecting arm 205 and a rotating arm 206 are interconnected via pins 201B, 204 and 205A in such a manner that they are relatively rotated. The arm follower plate 201A is also engaged with a rail 201C extended in a direction in which the elevating plate 16K' can be raised/ lowered, and can move along the rail 201C.

The rotating arm 206 can be rotated about an axis of a pin 207A relative to a support member 207 fixedly attached to the accumulation processing device unit 50. The rotating operation of the rotating arm 206 pivotally rotated about the pin 207A is transmitted via the connecting arm 205 to the elevating arm 202. Since the elevating arm 202 is halfway supported rotatably via a pin 203A, the rotation of the rotating arm 206 allows the elevating arm 202 to rotate. Furthermore, the arm follower plate 201A and the elevating arm 202 are movably interconnected by the pin 201B in an elongate hole 202A in which the pin 201 can move. Therefore, when the elevating arm 202 rotates, a drive force is transmitted to the pin 201B, so that the arm follower plate 201A vertically moves along the rail 201C. When the arm follower plate 201A vertically moves, the elevating plate 16K' is raised/lowered.

Figure 23:
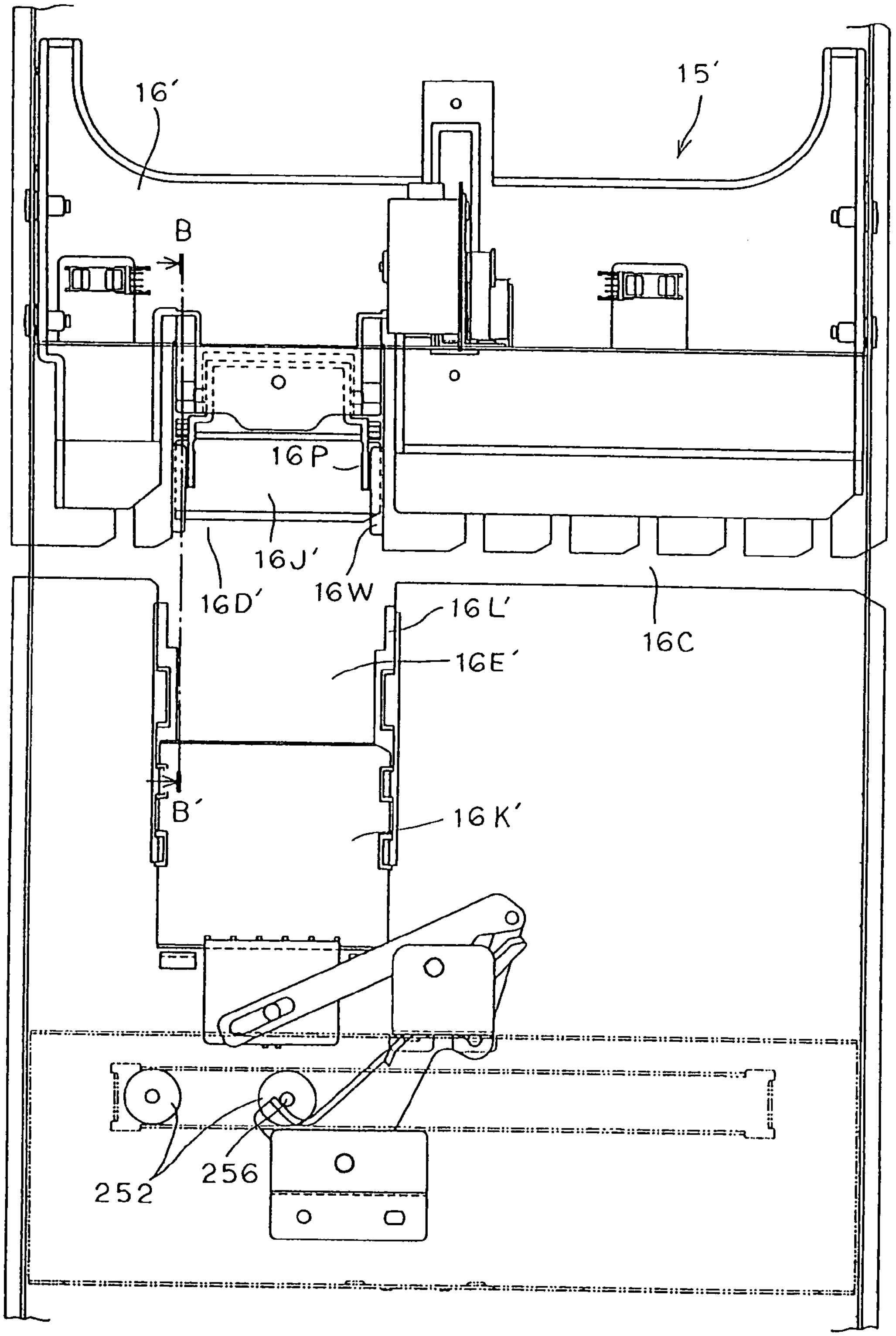
FIG. 23 is a rear view showing the structure of the shutter 15'.

FIG. 22 shows that the elevating plate 16K' just closes the horizontal opening 50*b*, and the rotating arm 206 is in a substantially horizontal position. On the other hand, FIG. 23 shows that the rotating arm 206 of FIG. 22 is rotated or moved to the left as seen in the figure (rotated counterclockwise) and the elevating plate 16K' is lowered to open the horizontal opening 50*b*.

Here, one side of the rotating arm 206 forms a substantially straight contact moving side 206B. The rotating arm 206, the connecting arm 205 and the elevating arm 202 are constituted in such a manner that the side 206B is in a substantially horizontal position when the elevating plate 16K' is closed. Moreover, one end of the rotating arm 206 on the side of the pin 207A has a contact moving side 206C curved and bent substantially by 90 degrees. On the other hand, the moving frame 87 (refer to FIG. 12) for moving the second holding means 10 toward the horizontal opening 50b is provided with a regulating member 256 which abuts on the contact moving sides 206B and 206C and a regulating member 255 which abuts only on the contact moving side 206B. When the second holding means 10 moves, the regulating members slide on the contact moving sides 206B and 206C or on the contact moving side 206C. When the second holding means 10 is in its initial position, the regulating member 255 is in a position shown in FIG. 22 to regulate the counterclockwise rotation of the rotating arm 206 and maintain the contact moving side 206B substantially horizontally. When the second holding means 10 moves horizontally toward the elevating plate 16K' inside the horizontal opening 50*b*, the regulating members 255 and 266 slide on the contact moving side 206B, but still regulate the rotation of the rotating arm 206. Subsequently, when the second holding means 10 reaches the elevating plate 16K', as shown in FIG. 23, only the regulating member 256 goes beyond the pin 207A, abuts on the contact moving side 206C and rotates the rotating arm 206 counterclockwise. The rotating movement is transmitted to the connecting arm 205 and the elevating arm 202, the arm follower plate 201A then moves downward along the rail 201C, and the elevating plate 16K' is lowered. When the second holding means 10 leaves the elevating plate 16K' to return to its initial position, the regulating member 256 leaves the contact moving side 206C and slides on the contact moving side 206B. To return the contact moving side 206B to the substantially horizontal position, the elevating plate 16K' is raised.

Figure 24:
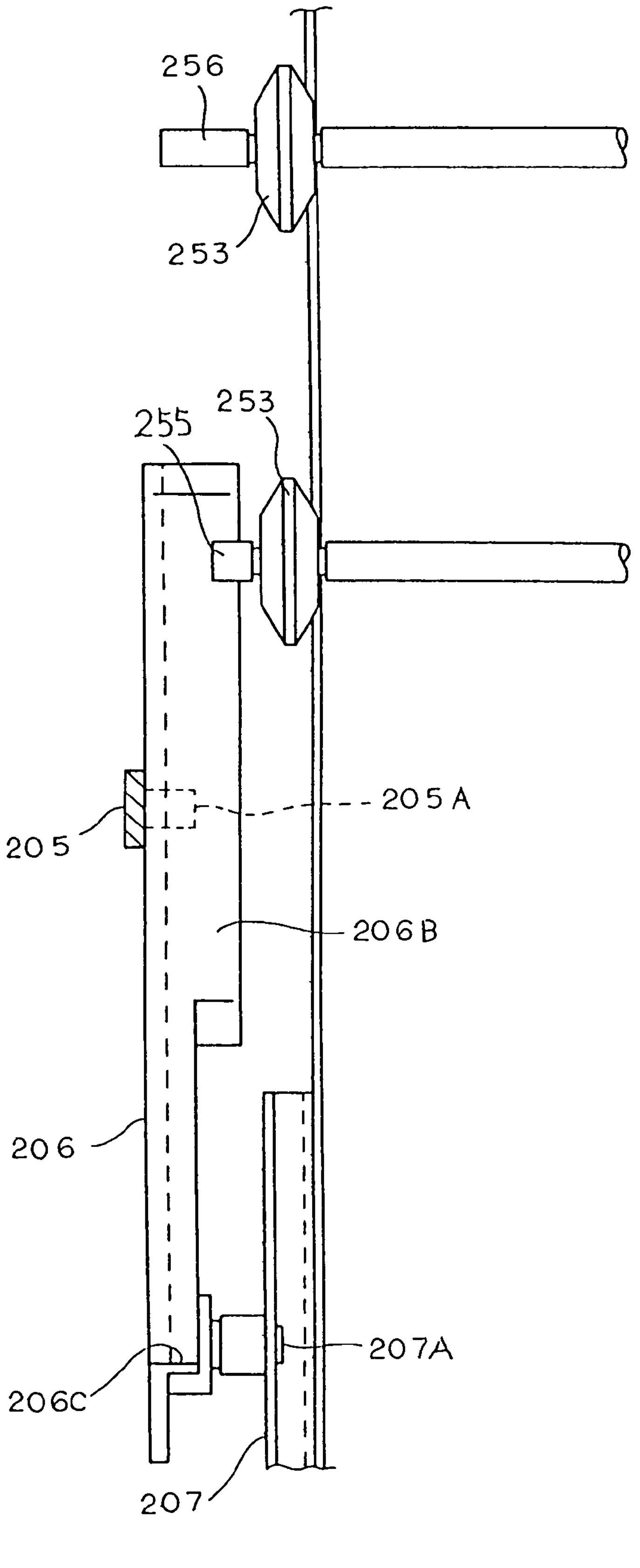
FIG. 24 is a plan view showing a relationship between regulating members 255 and 266 and a rotating arm 206.

FIG. 24 is a top view clarifying the relationship between the regulating members 255 and 256 and the rotating arm 206. The regulating members 255 and 256 integrally move in a direction in which the rotating arm 206 is extended. When the regulating members 255 and 256 are compared, the regulating member 256 is extended from a conical roller 253 described later longer as compared with the regulating member 255. In the initial position, as shown in FIG. 24, when the regulating member 255 abuts on the contact moving side 206B partially having a wide area, the rotation of the rotating arm 206 is regulated. On the other hand, for the other end of the contact moving side-206B, to avoid the abutment on the regulating member 255, a side of the contact moving side 206B opposed to the regulating member 255 is halfway cut thin. In the region, the regulating member 255 does not interfere with the contact moving side 206B or regulate the rotation of the rotating arm 206, but the regulating member 256 interferes with the contact moving side 206B. Therefore, the rotation of the rotating arm 206 is regulated by the regulating member 256. A configuration of the contact moving side 206B and a distance between the regulating members 255 and 256 are predetermined in such a manner that while the regulating members 255 and 256 integrally move toward the contact moving side 206C, the regulation of the rotating arm 206 by the regulating member 255 is replaced by the regulation by the regulating member 256. The regulating member 256 further moves along the contact moving side 206B and abuts on the contact moving side 206C to rotate the rotating arm 206 as aforementioned.

Figure 25:
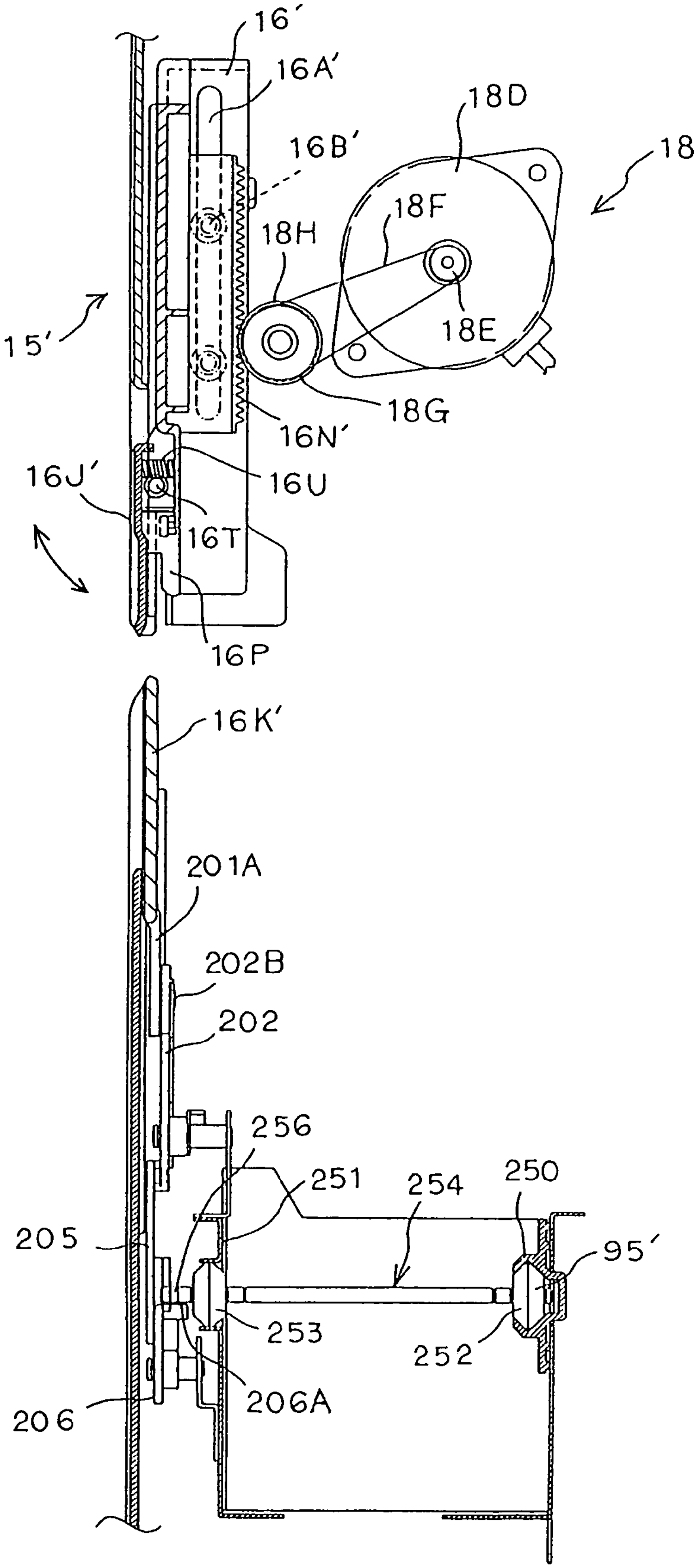
FIG. 25 is a side view showing a mechanism of the shutter 15'.

FIG. 25 is a partially broken side view of the shutter 15' showing that the movable plate 16J' and the elevating plate 16K' are slightly opened. Conical rollers 252 and 253 attached to opposite ends of a rod shaft 254 can be rotated about the shaft. Additionally, the shaft 254 and the conical rollers 252 and 253 form a running member 95' of the second embodiment replacing the running member 95 described with reference to FIG. 13 and the like. The running member 95' is disposed on the moving frame 87 for moving the second holding means 10 in the same manner as the running member 95 of the first embodiment. Rails 250 and 251 for running the conical rollers 252 and 253 are extended vertical to a surface of FIG. 25 to enable the second holding means 10 to move. By using the shaft 254 coaxially, the other end of one conical roller is provided with the cylindrical regulating member 256 described above. A portion of the outer periphery of the regulating member 256 abuts on the contact moving sides 206B and 206C of the rotating arm 206 to control the rotation of the rotating arm 206.

opening/closing of the movable plate 16J' will be described with reference to FIGS. 22, 23 and 25. The shutter plate 16' has opposite plate planes substantially perpendicularly bent in parallel with the side walls 50L and 50R in the vicinity of the side walls 50L and 50R of the accumulation processing device unit 50. As shown in FIG. 25, long holes 16A' are formed vertically in the plate plane, and the shutter plate 16' is vertically movably supported by pins 16B' attached to the side walls 50L and 50R. The shutter plate 16' is provided with an opening 16D'. To open/close the opening 16D', the movable plate 16J' is rotatably attached to the shutter plate 16' via a pin 16T. A spring or another elastic member 16U is also provided between the shutter plate 16' and the movable plate 16J', and acts on the movable plate 16J' to close the opening 16D' by using the shutter plate 16' as a support base. Therefore, the opening 16D is usually closed by the movable plate 16J'.

Furthermore, a stopper member 16P branched and extended toward the elevating plate 16K' is fixed to the movable plate 16J'. Here, when the second holding means 10 is in the initial position, the shutter plate 16' is positioned to close the horizontal opening 50*b*, while an opposed tip end of the elevating plate 16K' is interposed between the movable plate 16J' and the extended stopper member 16P. Therefore, the stopper member 16P interferes with the elevating plate 16K' to regulate the opening of the movable plate 16J'.

Figure 26:
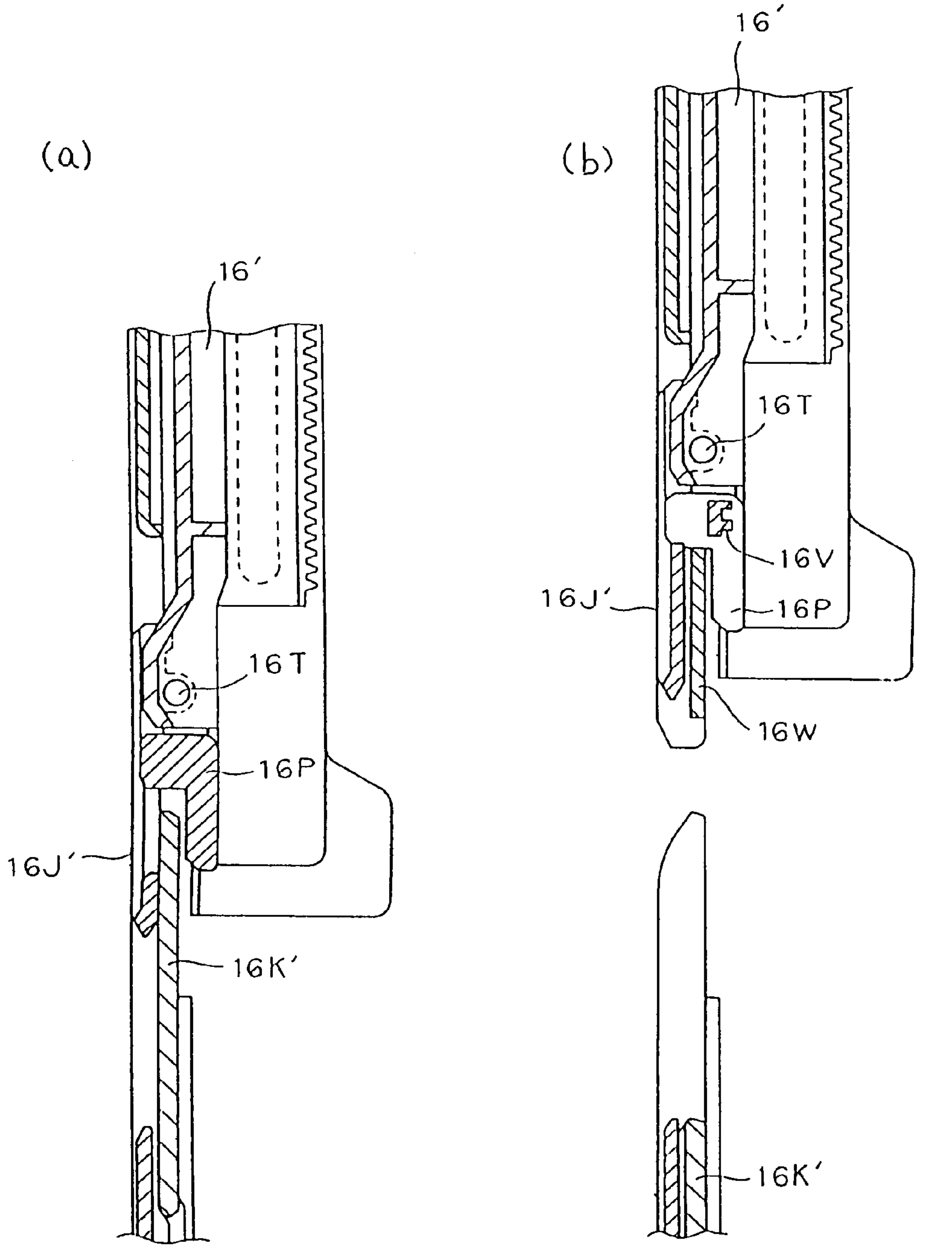
FIGS. 26A and 26B are side views showing a locking and an unlocking in a locking mechanism of the shutter 15'.

FIG. 26A is a side view taken along a broken line A–A' of FIG. 22 schematically showing a relationship between the movable plate 16J' and the elevating plate 16K'. Specifically, when the tip end of the elevating plate 16K' enters between the movable plate 16J' and the stopper member 16P, the movable plate 16J' is prevented from rotating about the pin 16T.

Even when the movable plate 16J' is apart from the elevating plate 16K', a mechanism for locking the opening prevents an open end of the movable plate 16J' from being lifted up to open from the outside, if the movable plate 16J' is being raised and within a predetermined distance. The locking mechanism will be described with reference to FIG. 26B.

FIG. 26B is a side view taken along a broken line B–B' of FIG. 23. A small piece 16V is provided in an opening/closing portion of the movable plate 16J'. A vertical regulating plate 16W is fixed to the accumulating tray 9A or 9B of the accumulation processing device unit 50 for interfering with the small piece 16V to regulate and inhibit the movable plate 16J' from rotating. When the movable plate 16J' is operated by the drive motor 18 to move upward, the small piece 16V moves upward relative to the regulating plate 16W. Subsequently, when the movable plate 16J' moves up by the predetermined distance, the small piece 16V fails to interfere with the regulating plate 16W. Therefore, the rotation of the movable plate 16J' is not regulated, the inhibition of rotation is removed, and the opening 16D' can be opened. Specifically, in order to open the opening 16D', the shutter plate 16' needs to move upward by the predetermined distance or more. Therefore, the access from the outside can be restricted, and safety can be enhanced by the locking mechanism. Alternatively, when the upper and lower holding levers 71 and 72 of the second holding means 10 just reach a position before the shutter plate 16', the inhibition may be removed.

Figure 27:
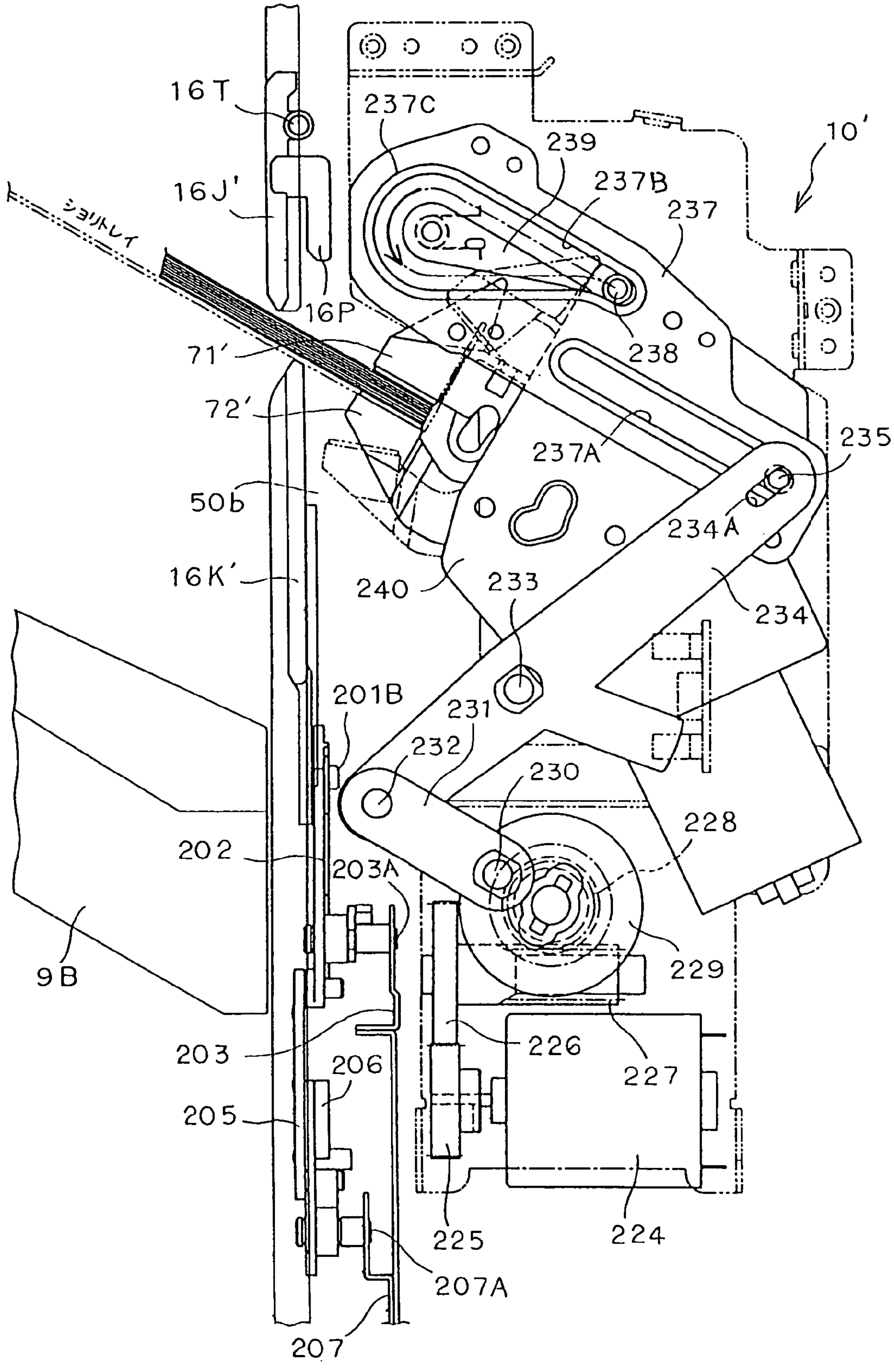
FIG. 27 is an enlarged sectional side view showing a main portion of a swinging mechanism of a second holding means 10' in a retreated condition according to the second embodiment.
Figure 28:
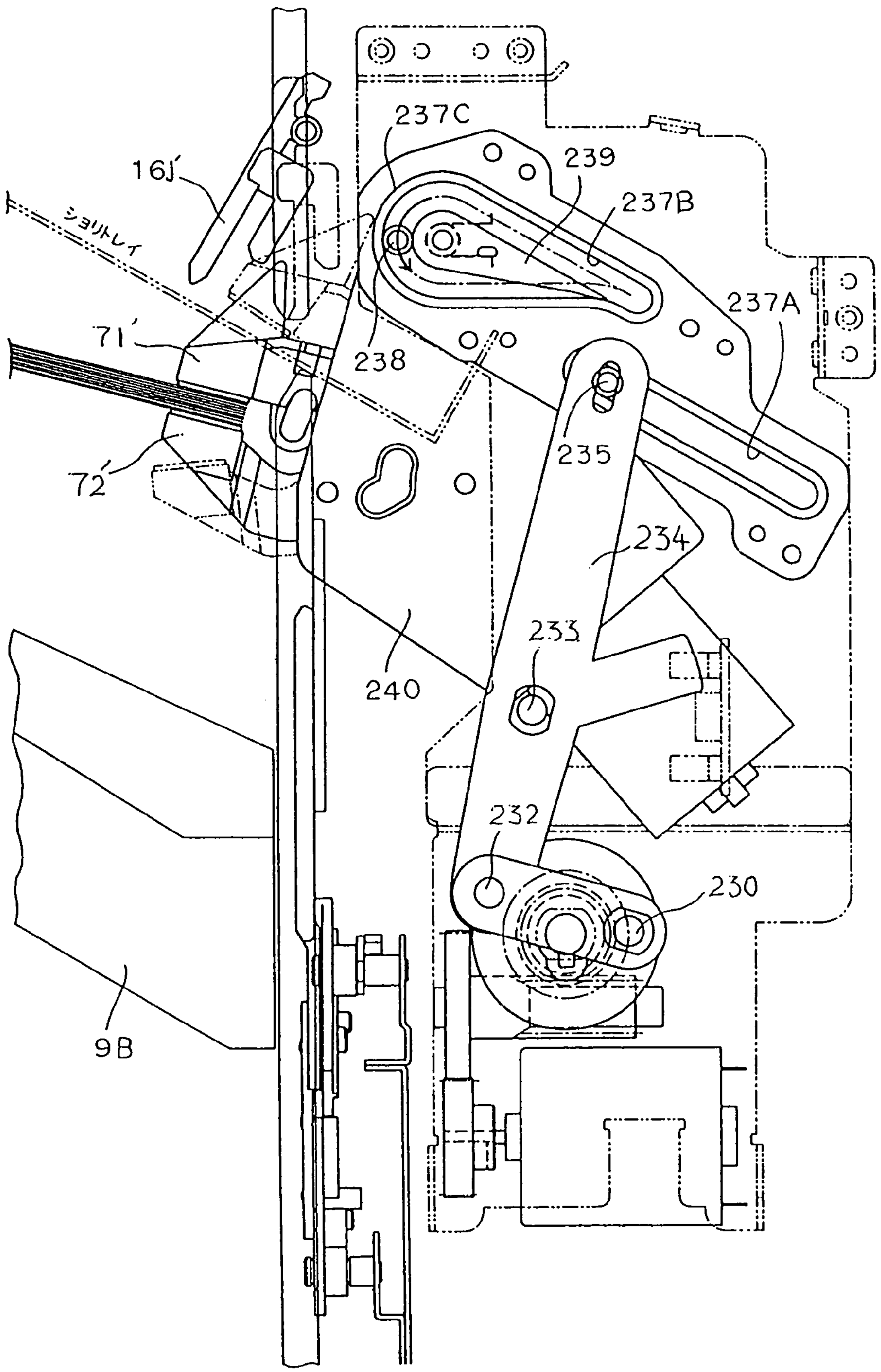
FIG. 28 is an enlarged sectional side view showing a main portion of the swinging mechanism of the second holding means 10' in an advanced condition according to the second embodiment.

FIG. 27 is an enlarged sectional side view of a main portion showing that a second holding means 10' receives and holds the sheet bunch from the first holding means 7 in an initial position according to the second embodiment. On the other hand, FIG. 28 is another enlarged sectional side view of the main portion showing that the second holding means 10' passes the horizontal opening 50*b* and reaches the movable plate 16J' and the elevating plate 16K' to rotate and operate a drive motor 224 in a protruded condition.

A basic mechanical constitution for advancing and retreating (so-called swinging) the second holding means 10' will be described with reference to FIGS. 27 and 28. In various drive systems, as shown in FIG. 17, in response to input/output signals from the CPU 120 and the memory means 121 such as ROM, RAM and the like, the parallel I/O 122 is operated and controlled. Furthermore, the swinging mechanism shown in FIGS. 27 and 28 is supported by a movable frame fixed to the running member 95' shown in FIG. 25, and moves as the running member 95' moves.

First, when copying operation is started, the shutter plate 16' is raised by the drive section 18 to open the horizontal opening 50*b*, and the predetermined sheet bunch is discharged onto the accumulating tray 9A or 9B of the accumulation processing device unit 50. When the second holding means 10' returns to the initial position, the shutter plate 16' is lowered to close the horizontal opening 50*b*.

The second holding means 10' has upper and lower holding levers 71' and 72' corresponding to the upper and lower holding levers 71 and 72 of the second holding means 10 of the first embodiment. The upper and lower holding levers 71' and 72' are advanced/retreated by the drive motor 224. The drive motor 224 is interconnected to gears 225, 226 and 227 and a pinion gear 228 for transmitting the rotation of the motor. A pin 230 is eccentrically attached to a rotating plate 229 which coaxially rotates when the pinion gear 228 rotates. A follower arm 231 is also rotatably attached to the pinion 230. For the other end of the pin 230, one end of a rotating arm 234 is rotatably attached via a pin 232 to the follower arm 231, and the rotating arm 234 can rotate about a fixed shaft 233 fixed to a movable frame (not shown). The other end of the rotating arm 234 is provided with an elongated hole 234A for passing through a pin 235. The pin 235 interconnects a lever support member 240 and the rotating arm 234 in such a manner that a portion of outer periphery of the pin 235 can be engaged to move along an elongated hole 237A formed in a swinging plate 237 for advancing/retreating the upper and lower holding levers 71' and 72'.

The swinging plate 237 is fixedly attached to the movable frame (not shown). The swinging plate 237 is also provided with a raindrop-shaped opening 237B. The opening 237B has therein a stopper plate 239 whose side is pressed with a predetermined contact pressure by a spring or another elastic member. Moreover, a pin 238 fixedly protruded from the support member 240 for supporting the upper and lower holding levers 71' and 72' can move along an outer side of the stopper plate 239 and an inner side of the opening 237B. As shown in FIG. 28, the pin 238 passes along a large curved portion 237C of the raindrop-shaped opening 237B in a direction shown by an arrow, pushes and detaches the stopper plate 239 from one side of the opening against the contact pressure of the elastic member of the stopper plate 239, further advances and returns to an original position shown in FIG. 27. On the other hand, the pin 238 fails to move in a direction opposite to the direction shown by the arrow because its passage is obstructed by the abutting stopper plate 239.

The advancing/retreating of the upper and lower holding levers 71' and 72' of the second holding means 10' will be described. In the retreated position of the upper and lower holding levers 71' and 72' shown in FIG. 27, one end of the rotating arm 234 having the pin 235 is retreated apart from the movable plate 16J'. When the upper and lower levers 71' and 72' once hold the sheet bunch and move to back surfaces of the movable plate 16J' and the elevating plate 16K', the drive motor 224 is rotated in such a manner that the rotating plate 229 is rotated to the right as seen in FIG. 27 (rotated clockwise). The follower arm 231 follows the rotation of the rotating plate 229 to rotate the rotating arm 234 about the fixed shaft 233 counterclockwise. Thereby, since the pin 235 advances along the elongated hole 237A of the swinging plate 237 toward the movable plate 16J', the support member 240 is pushed forward. At this time, the pin 238 also moves forward along a path made by the stopper plate 239 and the opening 237B, but changes its course to move downward along the large curved portion 237C. Thereby, since the support member 240 is pushed downward, the upper and lower holding levers 71' and 72' are changed from an oblique upward direction for holding to a horizontal direction.

FIG. 28 shows that the pin 238 just passes the curved portion 237C, and the upper and lower holding levers 71' and 72' push out the movable plate 16J' and are pushed outside while changing downward the holding direction. At this time, as aforementioned, the elevating plate 16K' is lowered by following the movement of the second holding means 10'. Furthermore, by rotating the drive motor 224, the pin 238 advances in a direction shown by an arrow in FIG. 28. Therefore, the upper and lower holding levers 71' and 72' are placed in a substantially horizontal condition. At this time, by opening the upper and lower holding levers 71' and 72', the sheet bunch is dropped onto the accumulating tray 9A or 9B (the sheet bunch is so-called discharged).

When the drive motor 224 is further rotated, the pin 235 leaves apart from the movable plate 16J'. Thereby, while pushing the stopper plate 239, the pin 238 returns to the initial position shown in FIG. 27. The stopper plate 239 then abuts on one side of the opening 237B via its elastic member again, thereby inhibiting the pin 235 from moving in reverse. In this manner, the upper and lower holding levers 71' and 72' return to the retreated position shown in FIG. 27, and the movable plate 16J' closes the opening 16D' via the elastic member 16U shown in FIG. 26.

As aforementioned, the opening via which the holding means for holding the sheet bunch moves is controlled to open/close. Furthermore, the opening via which the holding means is protruded to discharge the sheets is provided with the locking mechanism. Therefore, the access from the outside is prevented, and a highly safe accumulation processing device can be provided. Additionally, the movable plate 16J' as the vertical rotating shutter forming the opening section for discharging the sheets cooperate with the elevating shutter or plate 16K' to operate the locking mechanism. Moreover, the elevating shutter is constituted to be able to rise/lower in response to the movement of the holding means. There can thus be provided a simple and low-cost sheet accumulation processing device having the shielding mechanism which does not require a complicated control.

What is claimed is:

1. A sheet accumulation processing device comprising:

a sheet holding means, said sheet holding means operable to extend from a first opening and for conveying a plurality of sheets onto a sheet accumulating tray, wherein said plurality of sheets are first conveyed out of a second ooening to said sheet holding means; and an opening shielding device disposed over the first opening wherein the opening shielding device retracts to an open position when the sheet holding means extends through the first opening to convey the plurality of sheets and said shielding device is in a closed position at all other times.

2. The sheet accumulation processing device as recited in claim 1, wherein the sheet holding means is rotated prior to being conveyed though the opening.

3. A sheet accumulation processor including:

a sheet holding means, said sheet holding means operable to extend from a first opening and for conveying a plurality of sheets onto a sheet accumulating tray, wherein said plurality of sheets are first conveyed out of a second opening to said sheet holding means; and an opening shielding device disposed over the first opening wherein the opening shielding device has a suspension plate supported by a support means coupled to an upper portion of the opening shielding device and an elevated plate, said opening shielding device liftably supported by a lifting means coupled to a lower portion of the shielding device wherein the suspension plate and the elevating plates are in an open position when the sheet holding means extends through the opening to convey the plurality of sheets and in a closed position at all other times.

4. The sheet accumulation processor as recited in claim 3, wherein said elevating plate is biased upward by at least one elastic member in a default position, whereby said at least one elastic member pushes said elevating place downward to achieve an open position and upward to achieve a closed position.

5. A sheet accumulation processing device comprising:

a sheet holding means comprised of a first holding means and a second holding means, said first holding means for holding a matched sheet bunch, and a second holding means for receiving and conveying said matched sheet bunch;

said sheet holding means operable to extend from a first opening and for conveying said sheets onto a sheet accumulating tray, wherein said plurality of sheets are first conveyed out of a second opening to first holding means; and an opening shielding device disposed over the first opening wherein the opening shielding device retracts to an open position when the second holding means extends through the first opening to convey the plurality of sheets and in a closed position at all other times.

6. The device recited in claim 5, wherein said second sheet holding means includes upper and lower holding levers, said levers advanced and retreated by a drive motor connected to said levers through a gear and drive assembly that in turn moves a pair of arms connected by a pin, one of said arms configured such that it advances and retreats said levers by moving along a hole formed in a swinging plate.

7. The device recited in claim 5, wherein said second holding means includes upper and lower levers for holding said sheet bunch on the top and bottom surfaces, said levers respectively rotably supported by a pair of shafts, said shafts configured to open and close said levers via a pair of arms, each of said arms respectively engaged in a groove in the respective levers.

8. The device as recited in claim 7, wherein said second holding means is configured with a drive gear and attachment means such that said levers are opened at different angles at the same time when said second holding means is opened and closed.

* * * * *